United States Patent
Chen et al.

(10) Patent No.: US 9,681,339 B2
(45) Date of Patent: Jun. 13, 2017

(54) SECURITY PROCESSING METHOD AND SYSTEM IN NETWORK HANDOVER PROCESS

(71) Applicant: Huawei Technologies Co., Ltd., Shenzhen, Guangdong (CN)

(72) Inventors: Jing Chen, Shanghai (CN); Dongmei Zhang, Wuhan (CN); Xiaoying Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 14/526,205

(22) Filed: Oct. 28, 2014

(65) Prior Publication Data
US 2015/0043537 A1   Feb. 12, 2015

Related U.S. Application Data

(63) Continuation of application No. PCT/CN2012/075094, filed on May 4, 2012.

(51) Int. Cl.
*H04W 12/04* (2009.01)
*H04W 36/00* (2009.01)
(Continued)

(52) U.S. Cl.
CPC ....... *H04W 36/0038* (2013.01); *H04W 12/04* (2013.01); *H04W 12/06* (2013.01); *H04W 36/14* (2013.01)

(58) Field of Classification Search
CPC .. H04W 12/04; H04W 12/06; H04W 36/0038
See application file for complete search history.

(56) References Cited

U.S. PATENT DOCUMENTS 8,213,939 B2 * 7/2012 Iwamura ............... H04W 12/04
  370/331
8,675,607 B2 * 3/2014 Stenfelt ............. H04W 36/0022
  370/331
(Continued)

FOREIGN PATENT DOCUMENTS

CN   101232731 A   7/2008
CN   101299888 A   11/2008
(Continued)

OTHER PUBLICATIONS

"3$^{rd}$ Generation Partnership Project; Technical Specification Group Services and System Aspects; 3G Security; Security Architecture (Release 11)," 3GPP TS 33.102, V11.2.0, pp. 1-76, 3$^{rd}$ Generation Partnership Project, Valbonne, France (Mar. 2012).

(Continued)

*Primary Examiner* — Ricky Ngo
*Assistant Examiner* — Lan Huong Truong
(74) *Attorney, Agent, or Firm* — Leydig, Voit & Mayer, Ltd.

(57) ABSTRACT

Embodiments of the present invention disclose a security processing method and system in a network handover process. The method includes: generating, by a network switching node, a target key after receiving a handover request; sending, by the network switching node, security information including the target key to a target network node, and receiving a handover response message sent by the target network node; and sending, by the network switching node, a handover command to a mobile terminal, so that the mobile terminal accesses a target network. By adopting the present invention, security processing in handover of a mobile terminal from a 3G network to an HSPA network or an LTE network may be completed in a case that the network switching node currently used in the network is not changed.

14 Claims, 8 Drawing Sheets

(51) Int. Cl.
*H04W 36/14* (2009.01)
*H04W 12/06* (2009.01)

(56) References Cited

U.S. PATENT DOCUMENTS

| | | | | |
|---|---|---|---|---|
| 9,344,924 | B2* | 5/2016 | Wu | H04W 36/0033 |
| 9,392,626 | B2* | 7/2016 | Paisal | H04N 7/148 |
| 2008/0184032 | A1* | 7/2008 | Li | H04W 12/06 |
| | | | | 713/171 |
| 2009/0029677 | A1* | 1/2009 | Choi | H04W 12/06 |
| | | | | 455/411 |
| 2010/0220862 | A1 | 9/2010 | Geary et al. | |
| 2011/0092213 | A1* | 4/2011 | Forsberg | H04L 63/06 |
| | | | | 455/436 |
| 2011/0116629 | A1* | 5/2011 | Forsberg | H04L 9/083 |
| | | | | 380/44 |
| 2011/0222690 | A1* | 9/2011 | Gan | H04W 12/04 |
| | | | | 380/272 |
| 2012/0164979 | A1* | 6/2012 | Bachmann | H04L 63/164 |
| | | | | 455/411 |
| 2013/0051368 | A1 | 2/2013 | Liu et al. | |
| 2014/0068709 | A1 | 3/2014 | Xu et al. | |

FOREIGN PATENT DOCUMENTS

| CN | 101309500 A | 11/2008 |
|---|---|---|
| CN | 101536463 A | 9/2009 |
| CN | 101552983 A | 10/2009 |
| EP | 2117248 A1 | 11/2009 |
| EP | 2416598 A1 | 2/2012 |
| JP | 2013526194 A | 6/2013 |
| WO | WO 0076194 A1 | 12/2000 |
| WO | WO 2009082172 A2 | 7/2009 |
| WO | WO 2010061051 A1 | 6/2010 |
| WO | WO 2011134436 A1 | 11/2011 |

OTHER PUBLICATIONS

"3$^{rd}$ Generation Partnership Project; Technical Specification Group Core Network and Terminals; Non-Access-Stratum (NAS) Protocol for Evolved Packet System (EPS); Stage 3 (Release 11)," 3GPP TS 24.301, V11.2.1, pp. 1-327, 3$^{rd}$ Generation Partnership Project, Valbonne, France (Mar. 2012).

"3$^{rd}$ Generation Partnership Project; Technical Specification Group Services and System Aspects; 3GPP System Architecture Evolution (SAE); Security Architecture (Release 11)," 3GPP TS 33.401, V11.3.0, pp. 1-120, 3$^{rd}$ Generation Partnership Project, Valbonne, France (Mar. 2012).

"Integrity protection and ciphering at GSM to UMTS handover," ETSI STC SMG2 Handover ad-Hoc, Copenhagen, Denmark, Tdoc33/00, ETSI, Sophia Antipolis, France (Mar. 6-8, 2000).

2$^{nd}$ Office Action in corresponding European Patent Application No. 12876010 (Aug. 29, 2016).

* cited by examiner

SECURITY PROCESSING METHOD AND SYSTEM IN NETWORK HANDOVER PROCESS

CROSS-REFERENCE TO RELATED APPLICATIONS

This application is a continuation of International Patent Application No. PCT/CN2012/075094, filed on May 4, 2012, which is hereby incorporated by reference in its entirety.

TECHNICAL FIELD

The present invention relates to the field of communication network technologies, and in particular, to a security processing method and system in a network handover process.

BACKGROUND

An HSPA (high speed packet access) network is a network capable of providing high-speed uplink and downlink communication rates. An LTE (long term evolution) network is evolved from a current 3G network, and can improve performance of cell-edge users, improve cell capacity, and decrease a system delay. In a future communication network, a 3G network, an HSPA network, and an LTE network will coexist for a long period of time.

A user, who is performing a voice call in a 3G network, may move to an HSPA or LTE cell, so that the voice service needs to be handed over to a new system in order to maintain continuity of a voice service. In a current solution for implementing a seamless connection of voice and data services between a 3G network and HSPA and LTE networks, a source core network node MSC server (mobile switching center server) needs to determine whether a target system of handover is an LTE network system or an HSPA network system, and different security processing is performed for different target systems, but currently the MSC server does not have the discrimination capability.

SUMMARY

A technical problem to be solved by embodiments of the present invention is to provide a security processing method and system in a network handover process, which may perform security processing on a mobile terminal in a network handover process in a case that a network switching node does not know a type of a target system.

In order to solve the foregoing technical problem, an embodiment of the present invention provides a security processing method in a network handover process, where the method includes:
  generating, by a network switching node, a target key after receiving a handover request;
  sending, by the network switching node, security information including the target key to a target network node, and receiving a handover response message sent by the target network node; and
  sending, by the network switching node, a handover command to a mobile terminal, so that the mobile terminal accesses a target network.

Accordingly, an embodiment of the present invention further provides another security processing method in a network handover process, where the method includes:
  receiving, by a target network node, security information which is sent by a network switching node and includes a target key, where the target key is generated by the network switching node after a handover request is received; and
  sending, by the target network node, a handover response message to the network switching node, so that the network switching node sends a handover command to a mobile terminal, and the mobile terminal accesses a target network.

Accordingly, an embodiment of the present invention further provides another security processing method in a network handover process, where the method includes:
  sending, by a network switching node, security information including a local key of the network switching node to a target network node after receiving a handover request, where the local key includes a local cipher key and/or a local integrity protection key;
  receiving, by the network switching node, a handover response message sent by the target network node; and
  sending, by the network switching node, a handover command to a mobile terminal, so that the mobile terminal accesses a target network.

Accordingly, an embodiment of the present invention further provides another security processing method in a network handover process, where the method includes:
  receiving, by a target network node, security information which is sent by a network switching node and includes a local key of the network switching node, where the local key includes a local cipher key and/or a local integrity protection key; and
  sending, by the target network node, a handover response message to the network switching node, so that the network switching node sends a handover command to a mobile terminal, and the mobile terminal accesses a target network.

Accordingly, an embodiment of the present invention further provides another security processing method in a network handover process, where the method includes:
  receiving, by a mobile terminal, a handover command sent by a network switching node, where the handover command is generated by the network switching node according to a handover response message sent by a target network node;
  generating, by the mobile terminal, a security key according to a random value carried in the handover command and a local key of the mobile terminal; and
  accessing, by the mobile terminal, a target network according to the handover command and the security key.

Accordingly, an embodiment of the present invention further provides a network switching node, including:
  a processing module, configured to generate a target key after a handover request is received;
  a sending module, configured to send security information including the target key to a target network node after the processing module generates the target key; and
  a receiving module, configured to receive the handover request, and configured to receive a handover response message sent by the target network node; where
  the sending module is further configured to send a handover command to a mobile terminal, so that the mobile terminal accesses a target network.

Accordingly, an embodiment of the present invention further provides a serving general packet radio service support node, including:

a receiving module, configured to receive security information which is sent by a network switching node and includes a target key, where the target key is generated by the network switching node after a handover request is received; and a sending module, configured to send a handover response message to the network switching node, so that the network switching node sends a handover command to a mobile terminal, and the mobile terminal accesses a target network.

Accordingly, an embodiment of the present invention further provides a mobility management entity, including:

a receiving module, configured to receive security information which is sent by a network switching node and includes a target key, where the target key is generated by the network switching node after a handover request is received; and a sending module, configured to send a handover response message to the network switching node, so that the network switching node sends a handover command to a mobile terminal, and the mobile terminal accesses a target network.

Accordingly, an embodiment of the present invention further provides a network switching node, including:

a sending module, configured to send security information including a local key of a network switching node to a target network node after a handover request is received, where the local key includes a local cipher key and/or a local integrity protection key; and a receiving module, configured to receive a handover response message sent by the target network node; where the sending module is further configured to send a handover command to a mobile terminal, so that the mobile terminal accesses a target network.

Accordingly, an embodiment of the present invention further provides a serving general packet radio service support node, including:

a receiving module, configured to receive security information which is sent by a network switching node and includes a local key of the network switching node, where the local key includes a local cipher key and/or a local integrity protection key; and a sending module, configured to send a handover response message to the network switching node, so that the network switching node sends a handover command to a mobile terminal, and the mobile terminal accesses a target network.

Accordingly, an embodiment of the present invention further provides a mobility management entity, including:

a receiving module, configured to receive security information which is sent by a network switching node and includes a local key of the network switching node, where the local key includes a local cipher key and/or a local integrity protection key; and a sending module, configured to send a handover response message to the network switching node, so that the network switching node sends a handover command to a mobile terminal, and the mobile terminal accesses a target network.

Accordingly, an embodiment of the present invention further provides a mobile terminal, including:

a receiving module, configured to receive a handover command sent by a network switching node, where the handover command is generated by the network switching node according to a handover response message sent by a target network node;

a processing module, configured to generate a security key according to a random value carried in the handover command and a local key of the mobile terminal; and an accessing module, configured to access a target network according to the handover command and the security key.

Accordingly, an embodiment of the present invention further provides a security processing system in a network handover process, where the system includes the foregoing network switching node, serving general packet radio service support node, mobility management entity, and mobile terminal.

Implementing the embodiments of the present invention has the following beneficial effects:

According to the embodiments of the present invention, security processing may be better completed in handover of a mobile terminal from a 3G network to an HSPA network or an LTE network in a case that a network switching node does not know a type of a target system, that is, the network switching node currently used in the network is not changed, thereby saving costs.

BRIEF DESCRIPTION OF DRAWINGS

To describe the technical solutions in the embodiments of the present invention more clearly, the following briefly introduces accompanying drawings needed for describing the embodiments. Apparently, the accompanying drawings in the following description show merely some embodiments of the present invention, and persons of ordinary skill in the art may further obtain other drawings according to the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
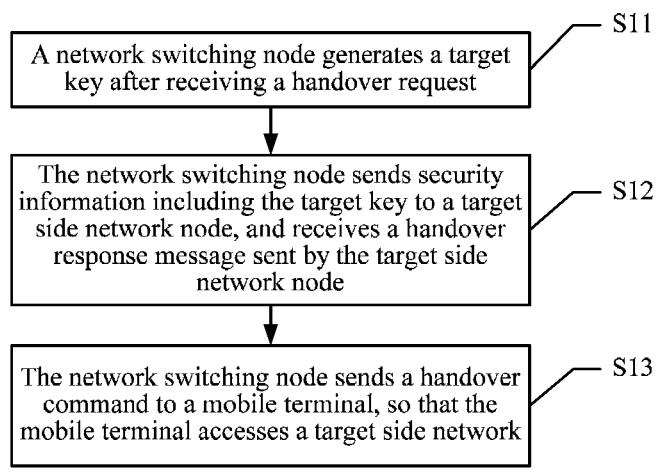
FIG. 1 is a schematic flow chart of an embodiment of a security processing method in a network handover process according to the present invention.

Referring to FIG. 1, FIG. 1 is a schematic flow chart of an embodiment of a security processing method in a network handover process according to the present invention. In this embodiment, a user enters an HSPA network or an LTE network from a 3G network in a process of communicating through a mobile terminal, and the method includes:

S11: When receiving a handover request, a network switching node generates a target key.

Specifically, the network switching node may be an MSC server. In the following, the method in this embodiment is described by taking the MSC server as the network switching node, and for other types of network switching nodes, same processing is performed. The MSC server receives a handover request from a source access network node RNC (radio network controller) connected to the MSC server.

S11 may specifically include: obtaining, by the network switching node, a random value $NONCE_{MSC}$ after receiving the handover request from a source network control node; generating, by the network switching node, a target key according to the random value $NONCE_{MSC}$ and a local key of the network switching node, where the local key includes a local cipher key and/or a local integrity protection key, and the target key includes a target cipher key and/or a target integrity protection key.

After receiving a handover request about a mobile terminal that undergoes network handover, the MSC server generates a random value $NONCE_{MSC}$. Definitely, the random value $NONCE_{MSC}$ may also be generated by the source RNC and is sent to the MSC server by the source RNC.

The MSC server makes derivation and generates a target key including a target cipher key $CK'_{ps}$ and a target integrity protection key $IK'_{ps}$ according to the random value $NONCE_{MSC}$ and according to a stored local key which corresponds to the mobile terminal and includes a local cipher key $CK_{cs}$ and a local integrity protection key $IK_{cs}$. It should be noted that, the MSC server does not need to know a type of a target network, and may generate the target key only according to the random value $NONCE_{MSC}$ that is generated by the MSC server or obtained from the source RNC and a locally stored key identifier.

S12: The network switching node sends security information including the target key to a target network node, and receives a handover response message sent by the target network node.

The MSC server sends the security information including the target key to a designated target network node according to the handover request. If the target network is HSPA, the target network node is an SGSN (serving GPRS support node). If the target network is LTE, the target network node is an MME (mobility management entity). After receiving the security information including the target key, and after performing resource allocation and security processing, the target network node returns the handover response message to the network switching node.

S13: The network switching node sends a handover command to the mobile terminal, so that the mobile terminal accesses the target network. The handover command is delivered to the mobile terminal through the source RNC. For example, the network switching node sends signaling for handover to the source RNC, and the source RNC generates a handover command and sends the handover command to the mobile terminal. In other embodiments of the present invention, the network switching node may also send the handover command to the mobile terminal by referring to this manner in which the handover command is delivered to the mobile terminal through the source RNC.

After receiving the handover response message, the network switching node may send the handover command to the mobile terminal through the source RNC. The mobile terminal correctly accesses the target network according to the handover command, and communicates in a secure and reliable manner.

Further, in generating, by the network switching node, the target key and sending, by the network switching node, the target key to the target network node in S11 of this embodiment, corresponding target network nodes in different target networks may execute different operations according to the target key, and therefore, the handover response message sent by the target network node and received by the network switching node in S12 includes different types of handover information.

Specifically, when the target network node is an SGSN, the receiving the handover response message sent by the target network node includes:

receiving a handover response message which is sent by the SGSN and carries a transparent container, where the transparent container is generated by a target access network node after the SGSN sends the target key to the target access network node.

When the target network node is a mobility management entity MME, the receiving the handover response message sent by the target network node includes:

receiving a handover response message which is sent by the MME and carries a transparent container, where the transparent container is generated by a target access network node and is sent to the MME by the target access network node; or, receiving a handover response message which is sent by the MME and carries a transparent container, where the transparent container is generated by a target access network node and is sent to the MME by the target access network node, the transparent container includes a random value $NONCE_{MME}$, and the $NONCE_{MME}$ is generated by the MME when the security information is received.

In the foregoing case, that is, in a case that the network switching node sends the target key and does not send the random value $NONCE_{MSC}$ obtained by the network switching node, the sending, by the network switching node, the handover command to the mobile terminal in S13 includes:

sending, by the network switching node, the handover command to the mobile terminal, wherein the handover command carries the random value $NONCE_{MSC}$; or sending, by the network switching node, the random value $NONCE_{MSC}$ and the transparent container to the source access network node, so that the source access network node sends the handover command to the mobile terminal, wherein handover command carries the random value $NONCE_{MSC}$ and the transparent container; or sending, by the network switching node, the $NONCE_{MSC}$ and the transparent container to the source access network node, and sending the handover command to the mobile terminal, wherein handover command carries the transparent container, and the $NONCE_{MSC}$ is ignored by the source access network node; where the network switching node may send the handover command to the mobile terminal through the source RNC, wherein the handover response message carries the transparent container into which the random value $NONCE_{MSC}$ is written by the network switching node, the transparent container is included in the handover response message by the target network node, or the network switching node may send the handover command to the mobile terminal through the source RNC, wherein the handover command directly carries the $NONCE_{MSC}$.

Further, in generating, by the network switching node, the target key and sending, by the network switching node, the target key to the target network node in S11 of this embodiment, the random value $NONCE_{MSC}$ may also be sent to the target network node, corresponding target network nodes in different target networks may execute different operations according to the target key, and therefore, the handover response message that is sent by the target network node and is received by the network switching node in S12 includes different types of handover information.

Specifically, when the target network node is an SGSN, the receiving the handover response message sent by the target network node includes:

receiving a handover response message which is sent by the SGSN and carries a transparent container, where the transparent container is generated by a target access network node and is sent to the SGSN by the target access network node, the transparent container includes the random value $NONCE_{MSC}$, the target access network node encapsulates the random value $NONCE_{MSC}$ in the transparent container, and the $NONCE_{MSC}$ is sent by the SGSN to the target access network node.

When the target network node is a mobility management entity MME, the receiving the handover response message sent by the target network node includes:

receiving a handover response message which is sent by the MME and carries a transparent container, where the transparent container is generated by a target access network node and is sent to the MME by the target access network node, the transparent container includes the random value $NONCE_{MSC}$, the target access network node encapsulates the random value $NONCE_{MSC}$ in the transparent container, the $NONCE_{MSC}$ is sent by the MME to the target access network node; or, receiving a handover response message which is sent by the MME and carries a transparent container, where the transparent container is generated by a target access network node and is sent to the MME by the target access network node, the transparent container includes the random value $NONCE_{MSC}$ and the random value $NONCE_{MME}$, the target access network node encapsulates the random value $NONCE_{MSC}$ and the random value $NONCE_{MME}$ in the transparent container, the $NONCE_{MSC}$ is sent by the MME to the target access network node, and the $NONCE_{MME}$ is generated by the MME after the security information is received and is sent to the target access network node; or, receiving a handover response message which is sent by the MME and carries a transparent container, where the transparent container is generated by a target access network node and is sent to the MME by the target access network node, the transparent container includes the random value $NONCE_{MME}$, the target access network node encapsulates the random value $NONCE_{MME}$ in the transparent container, and the $NONCE_{MME}$ is generated by the MME after the security information is received and is sent to the target access network node.

Further, in generating, by the network switching node, the target key and sending, by the network switching node, the target key to the target network node in S11 of this embodiment, the random value $NONCE_{MSC}$ and the local key of the network switching node may also be sent to the target network node, corresponding target network nodes in different target networks may execute different operations according to the target key, and therefore, the handover response message that is sent by the target network node and is received by the network switching node in S12 includes different types of handover information.

Specifically, when the target network node is an SGSN, the receiving the handover response message sent by the target network node includes:

receiving a handover response message which is sent by the SGSN and carries a transparent container, where the transparent container includes the random value $NONCE_{MSC}$ encapsulated by the target network node, and the random value $NONCE_{MSC}$ is sent by the SGSN to the target network node.

When the target network node is an MME, the receiving the handover response message sent by the target network node includes:

receiving a handover response message which is sent by the MME and carries a transparent container, where the transparent container is generated by a target access network node and is sent to the MME by the target access network node, the transparent container includes the random value $NONCE_{MSC}$, the target access network node encapsulates the random value $NONCE_{MSC}$ in the transparent container, and the $NONCE_{MSC}$ is sent by the MME to the target access network node.

Alternatively, in another case, that is:

When the target network node is an SGSN, the receiving the handover response message sent by the target network node includes:

receiving a handover response message which is sent by the SGSN and carries a transparent container, where the transparent container is generated by a target access network node and is sent to the SGSN by the target access network node, the transparent container includes a random value $NONCE_{SGSN}$, the target access network node encapsulates the random value $NONCE_{SGSN}$ in the transparent container, and the random value $NONCE_{SGSN}$ is generated by the SGSN after the security information is received and is sent to the target network node by the SGSN.

When the target network node is an MME, the receiving the handover response message sent by the target network node includes:

receiving a handover response message which is sent by the MME and carries a transparent container, where the transparent container is generated by a target access network node and is sent to the MME by the target access network node, the transparent container includes the random value $NONCE_{MME}$, the target access network node encapsulates the random value $NONCE_{MME}$ in the transparent container, and the random value $NONCE_{MME}$ is generated by the MME after the security information is received and is sent to the target network node by the MME.

In the foregoing case, that is, in a case that the network switching node not only sends the target key but also sends the random value $NONCE_{MSC}$ obtained by the network switching node, the sending, by the network switching node, the handover command to the mobile terminal in S13 includes:

sending, by the network switching node, the handover command to the mobile terminal, wherein the handover command carries the transparent container; or, sending, by the network switching node, the transparent container to the mobile terminal through the source access network node; i.e., a corresponding random value $NONCE_{MSC}$ or $NONCE_{SGSN}$ or $NONCE_{MME}$ has been encapsulated in the transparent container and returned to the network switching node, and the network switching node only needs to directly forward a corresponding transparent container to the mobile terminal.

In this embodiment, the network switching node does not need to know the type of the target network to which the mobile terminal is handed over, calculates the target key only according to the random value that is generated or obtained at the network switching node and the key identifier stored at the network switching node, and sends the security information including the target key to the target network node, and the target network completes corresponding operations, such as security processing and resource allocation, according to the security information. According to the embodiment of the present invention, security processing in handover of the mobile terminal from the 3G network to a future HSPA network or LTE network may be completed without the need of improving existing network switching nodes, such as the MSC server.

Figure 2:
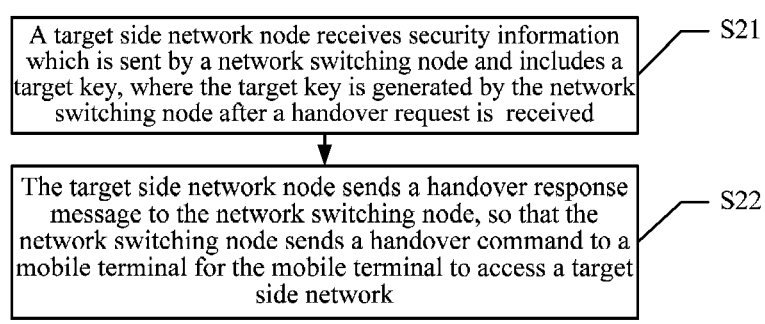
FIG. 2 is a schematic flow chart of an embodiment of another security processing method in a network handover process according to the present invention.

Referring to FIG. 2, FIG. 2 is a schematic flow chart of an embodiment of another security processing method in a network handover process according to the present invention. The method in this embodiment includes:

S21: A target network node receives security information which is sent by a network switching node and includes a target key, where the target key is generated by the network switching node after a handover request is received.

Specifically, the step of generating, by the network switching node, the target key may include: obtaining, by the network switching node, a random value $NONCE_{MSC}$ after receiving the handover request from a source network control node; and generating, by the network switching node, the target key according to the random value $NONCE_{MSC}$ and a local key of the network switching node, where the local key includes a local cipher key and/or a local integrity protection key, and the target key includes a target cipher key and/or a target integrity protection key.

S22: The target network node sends a handover response message to the network switching node, so that the network switching node sends a handover command to a mobile terminal for the mobile terminal to access a target network.

Specifically, in S22 of this embodiment, target network nodes of different target networks execute different operations. If the security information received by the target network node includes the target key and excludes the random value $NONCE_{MSC}$, and when the target network node is an SGSN, the sending, by the target network node, the handover response message to the network switching node includes:

sending, by the SGSN, the target key to a target access network node for the target access network node to generate a transparent container after receiving the target key, and the target access network node subsequently performs, according to the target key, secure communication processing on the mobile terminal handed over to the target network;

receiving, by the SGSN, the transparent container sent by the target access network node; and sending, by the SGSN, the handover response message to the network switching node, wherein the handover response message carries the transparent container.

When the target network node is a MME, the sending, by the target network node, the handover response message to the network switching node includes:

generating, by the MME, an intermediate key according to the target key in the security information for the MME subsequently to perform, according to the intermediate key, secure communication processing on the mobile terminal handed over to the target network;

receiving, by the MME, a transparent container, where the transparent container is generated by a target access network node and is sent to the MME by the target access network node; and sending, by the MME, the handover response message to the network switching node, wherein the handover response message carries the transparent container;

or includes:

generating, by the MME, a random value $NONCE_{MME}$, and generating an intermediate key according to the random value $NONCE_{MME}$ and the target key for the MME subsequently to perform, according to the intermediate key, secure communication processing on the mobile terminal handed over to the target network;

sending, by the MME, the random value $NONCE_{MME}$ to a target access network node for the target access network node to encapsulate the random value $NONCE_{MME}$ in the transparent container;

receiving, by the MME, the transparent container sent by the target access network node, where the random value $NONCE_{MME}$ is encapsulated in the transparent container; and sending, by the MME, the handover response message to the network switching node, wherein the handover response message carries the transparent container.

Specifically, in S22 of this embodiment, target network nodes of different target networks execute different operations. If the security information received by the target network node not only includes the target key but also includes the random value $NONCE_{MSC}$ obtained by the network switching node, the sending, by the target network node, the handover response message to the network switching node includes:

sending, by the SGSN, the target key and the random value $NONCE_{MSC}$ to a target access network node for the target access network node to generate a transparent container in which the random value $NONCE_{MSC}$ is encapsulated, and for the target access network node subsequently to perform, according to the target key, secure communication processing on the mobile terminal handed over to the target network;

receiving, by the SGSN, the transparent container sent by the target access network node; and sending, by the SGSN, the handover response message to the network switching node, wherein the handover response message carries the transparent container.

When the target network node is an MME, the sending, by the target network node, the handover response message to the network switching node includes:

generating, by the MME, an intermediate key according to the target key in the security information, so that the MME subsequently performs, according to the intermediate key, secure communication processing on the mobile terminal handed over to the target network; or, generating an intermediate key according to the target key and the random value $NONCE_{MSC}$ that are in the security information, so that the MME subsequently performs, according to the intermediate key, secure communication processing on the mobile terminal handed over to the target network;

sending, by the MME, the random value $NONCE_{MSC}$ to a target access network node, so that the target access network node generates a transparent container in which the random value $NONCE_{MSC}$ is encapsulated;

receiving, by the MME, the transparent container sent by the target access network node; and sending, by the MME, the handover response message to the network switching node, wherein the handover response message includes the transparent container;

or includes:

generating, by the MME, a random value $NONCE_{MME}$, and generating an intermediate key according to the random value $NONCE_{MME}$ and the target key that is in the security information, so that the MME subsequently performs, according to the intermediate key, secure communication processing on the mobile terminal handed over to the target network;

sending, by the MME, the random value $NONCE_{MME}$ and/or the random value $NONCE_{MSC}$ to a target access network node, so that the target access network node generates a transparent container in which the random value $NONCE_{MME}$ and/or the random value $NONCE_{MSC}$ is encapsulated, and sends the transparent container to the MME;

receiving the transparent container sent by the target access network node; and sending, by the MME, the handover response message to the network switching node, wherein the handover response message includes the transparent container.

Further, in S22 of this embodiment, target network nodes of different target networks execute different operations. If the security information received by the target network node not only includes the target key but also includes the random value $NONCE_{MSC}$ obtained by the network switching node and the local key of the network switching node, and when the target network node is an SGSN, the sending, by the target network node, the handover response message to the network switching node includes:

sending, by the SGSN, the target key and the random value $NONCE_{MSC}$ to a target access network node, so that the target access network node encapsulates the random value $NONCE_{MSC}$ in the transparent container, and the target access network node subsequently performs, according to the target key, secure communication processing on the mobile terminal handed over to the target network;

receiving, by the SGSN, the transparent container sent by the target access network node; and sending, by the SGSN the handover response message to the network switching node, wherein the handover response message carries the transparent container;

or includes:

generating, by the SGSN, a random value $NONCE_{SGSN}$, generating a new target key according to the random value $NONCE_{SGSN}$ and the local key, and sending the new target key and the random value $NONCE_{SGSN}$ to a target access network node, so that the target access network node generates a transparent container in which the random value $NONCE_{SGSN}$ is encapsulated, and the target access network node subsequently performs, according to the target key, secure communication processing on the mobile terminal handed over to the target network;

receiving, by the SGSN, the transparent container, in which the random value $NONCE_{SGSN}$ is encapsulated, sent by the target access network node to the SGSN; and sending, by the SGSN, the handover response message to the network switching node, wherein the handover response message carries the transparent container.

When the target network node is an MME, the sending, by the target network node, the handover response message includes:

generating, by the MME, an intermediate key according to the target key, so that the MME subsequently performs, according to the intermediate key, secure communication processing on the mobile terminal handed over to the target network; or, generating an intermediate key according to the target key and the random value $NONCE_{MSC}$, so that the MME subsequently performs, according to the intermediate key, secure communication processing on the mobile terminal handed over to the target network;

sending, by the MME, the random value $NONCE_{MSC}$ to a target access network node, so that the target access network node generates a transparent container in which the random value $NONCE_{MSC}$ is encapsulated;

receiving, by the MME, the transparent container, in which the $NONCE_{MSC}$ is encapsulated, sent by the target access network node; and sending, by the MME, the handover response message to the network switching node, wherein the handover response message includes the transparent container;

or includes:

generating, by the MME, a random value $NONCE_{MME}$, and generating an intermediate key according to the random value $NONCE_{MME}$ and the local key, so that the MME subsequently performs, according to the intermediate key, secure communication processing on the mobile terminal handed over to the target network;

sending, by the MME, the random value $NONCE_{MME}$ to a target access network node, so that the target access network node generates a transparent container in which the random value $NONCE_{MME}$ is encapsulated;

receiving, by the MME, the transparent container, in which the $NONCE_{MSC}$ is encapsulated, sent by the target access network node; and sending, by the MME, the handover response message to the network switching node, wherein the handover response message includes the transparent container.

In this embodiment, the network switching node does not need to know the type of the target network to which the mobile terminal is handed over, calculates the target key only according to the random value that is generated or obtained at the network switching node and the key identifier stored at the network switching node, and sends the security information including the target key to the target network node, and the target network completes corresponding operations, such as security processing and resource allocation, according to the security information. According to the embodiment of the present invention, security processing in handover of the mobile terminal from the 3G network to a future HSPA network or LTE network may be completed without the need of improving existing network switching nodes, such as the MSC server.

Figure 3:
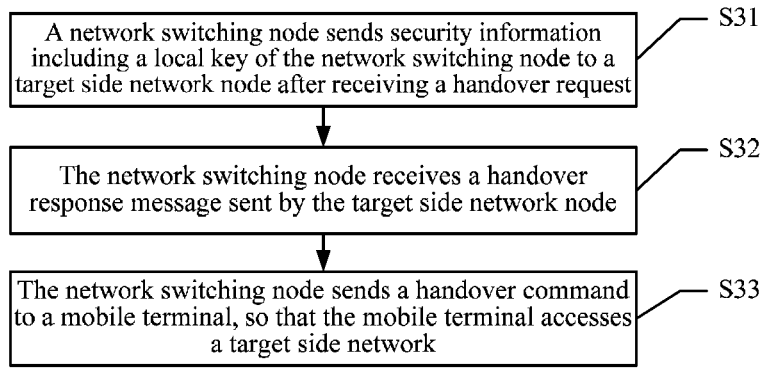
FIG. 3 is a schematic flow chart of an embodiment of another security processing method in a network handover process according to the present invention.

Referring to FIG. 3, FIG. 3 is a schematic flow chart of an embodiment of another security processing method in a network handover process according to the present invention. The method in this embodiment includes:

S31: After receiving a handover request, a network switching node sends security information including a local key of the network switching node to a target network node, where the local key includes a local cipher key and/or a local integrity protection key.

Specifically, the network switching node may be an MSC server. In the following, the method in this embodiment is described by taking the MSC server as the network switching node, and for other types of network switching nodes, same processing is performed. A mobile terminal undergoing network handover may send a handover request to the MSC server through a source access network node RNC (radio network controller) connected to the mobile terminal.

After receiving the handover request, the MSC server sends the security information including the local key to a designated target network node. The local key includes a local cipher key $CK_{cs}$ and/or a local integrity protection key $IK_{cs}$. The target network node includes an SGSN in an HSPA network, or includes an MME in an LTE network.

S32: The network switching node receives a handover response message sent by the target network node.

After receiving security information including a target key, and after performing resource allocation and notification, the target network node returns the handover response message to the network switching node.

S33: The network switching node sends a handover command to the mobile terminal, so that the mobile terminal accesses a target network.

After receiving the handover response message, the network switching node may send the handover command to the mobile terminal through the source RNC. The mobile terminal correctly accesses the target network according to the handover command, and communicates in a secure and reliable manner.

Similarly, in this embodiment, after receiving the handover request related to the network handover that the mobile terminal undergoes, the network switching node directly sends the local key of the network switching node to a network node of the target network. After receiving the local key, network nodes of different target networks execute different operations, and handover response messages received in step S32 are also different. Specifically, when the target network node is an SGSN, the receiving the handover response message sent by the target network node includes:

receiving a handover response message which is sent by the SGSN and carries a transparent container, where the transparent container is generated by a target access network node after the target key sent by the SGSN is received and the transparent container is sent to the SGSN, the transparent container includes a random value $NONCE_{SGSN}$, the target access network node encapsulates the random value $NONCE_{SGSN}$ in the transparent container, the random value $NONCE_{SGSN}$ is generated by the SGSN when the security information is received and the random value $NONCE_{SGSN}$ is sent to the target access network node, and the target key is generated by the SGSN according to the random value $NONCE_{SGSN}$ and the local key that is in the security information, and is used for the target access network node to subsequently perform, according to the target key, secure communication processing on the mobile terminal handed over to the target network.

When the target network node is an MME, the receiving the handover response message sent by the target network node includes:

receiving a handover response message which is sent by the MME and carries a transparent container, where the transparent container is generated by a target access network node and is sent to the MME by the target access network node, the transparent container includes a random value $NONCE_{MME}$, the target access network node encapsulates the random value $NONCE_{MME}$ in the transparent container, the random value $NONCE_{MME}$ is generated by the MME when the security information is received and the random value $NONCE_{MME}$ is sent to the target access network node by the MME, and the MME further generates an intermediate key according to the random value $NONCE_{MME}$ and the local key that is in the security information, so that the MME subsequently performs, according to the intermediate key, secure communication processing on the mobile terminal handed over to the target network.

The step of sending the handover command to the mobile terminal that needs to undergo handover in S33 may specifically include: carrying, by the network switching node, a transparent container returned by a corresponding target network node in the handover command, and sending the handover command to the mobile terminal; or, sending a transparent container returned by a corresponding target network node to the mobile terminal through the source access network node.

In this embodiment, the network switching node does not need to know the type of the target network to which the mobile terminal is handed over, calculates the target key only according to the random value that is generated or obtained at the network switching node and the key identifier stored at the network switching node, and sends the security information including the target key to the target network node, and the target network completes corresponding operations, such as security processing and resource allocation, according to the security information. According to the embodiment of the present invention, security processing in handover of the mobile terminal from the 3G network to a future HSPA network or LTE network may be completed without the need of improving existing network switching nodes, such as the MSC server.

Figure 4:
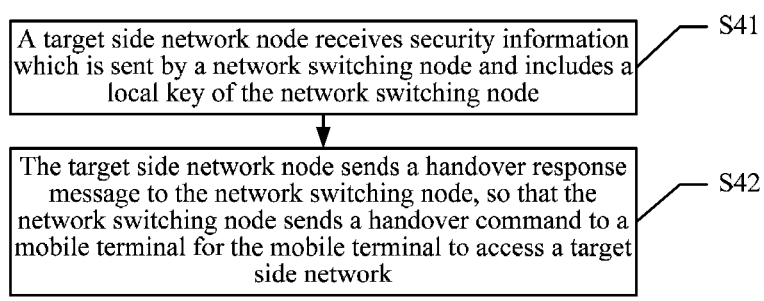
FIG. 4 is a schematic flow chart of an embodiment of another security processing method in a network handover process according to the present invention.

Referring to FIG. 4, FIG. 4 is a schematic flow chart of an embodiment of another security processing method in a network handover process according to the present invention. In the embodiment of the present invention, the method includes:

S41: A target network node receives security information which is sent by a network switching node and includes a local key of the network switching node, where the local key includes a local cipher key and/or a local integrity protection key.

A step of generating, by the network switching node, a target key may specifically include: obtaining, by the network switching node, a random value $NONCE_{MSC}$ after receiving a handover request from a source network control node; and generating, by the network switching node, the target key according to the random value $NONCE_{MSC}$ and the local key of the network switching node, where the local key includes the local cipher key and/or the local integrity protection key, and the target key includes a target cipher key and/or a target integrity protection key.

S42: The target network node sends a handover response message to the network switching node, so that the network switching node sends a handover command to a mobile terminal for the mobile terminal to access a target network.

Similarly, in S42, target network nodes in different target networks specifically execute different operations. Specifically, when the target network node is an SGSN, the sending, by the target network node, the handover response message includes:

generating, by the SGSN, a random value $NONCE_{SGSN}$, generating a target key according to the random value $NONCE_{SGSN}$ and the local key in the security information, and sending the target key to a target access network node, so that the target access network node subsequently performs, according to the target key, secure communication processing on the mobile terminal handed over to the target network;

receiving, by the SGSN, a transparent container, in which the random value $NONCE_{SGSN}$ is encapsulated, generated by the target access network node; and sending, by the SGSN, the handover response message to the network switching node, wherein the handover response message carries the transparent container in which the random value $NONCE_{SGSN}$ is encapsulated.

When the target network node is an MME, the sending, by the target network node, the handover response message includes:

generating, by the MME, a random value $NONCE_{MME}$, generating an intermediate key according to the random value $NONCE_{MME}$ and the local key that is in the security information, and sending the random value $NONCE_{MME}$ to a target access network node;

receiving, by the MME, a transparent container, in which the random value $NONCE_{MME}$ is encapsulated, generated by the target access network node; and sending, by the MME, a handover response command to the network switching node, wherein the handover response command carries the transparent container in which the random value $NONCE_{MME}$ is encapsulated.

In this embodiment, the network switching node does not need to know the type of the target network to which the mobile terminal is handed over, calculates the target key only according to the random value that is generated or obtained at the network switching node and the key identifier stored at the network switching node, and sends the security information including the target key to the target network node, and the target network completes corresponding operations, such as security processing and resource allocation, according to the security information. According to the embodiment of the present invention, security processing in handover of the mobile terminal from the 3G network to a future HSPA network or LTE network may be completed without the need of improving existing network switching nodes, such as the MSC server.

Figure 5:
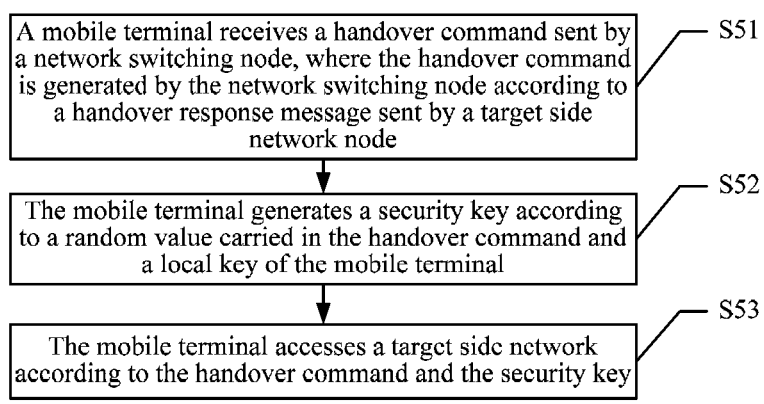
FIG. 5 is a schematic flow chart of an embodiment of another security processing method in a network handover process according to the present invention.

Referring to FIG. 5, FIG. 5 is a schematic flow chart of an embodiment of another security processing method in a network handover process according to the present invention. In this embodiment, a security processing method in a network handover process that is performed on a mobile terminal that undergoes handover is described in detail. In the embodiment of the present invention, the method includes:

S51: A mobile terminal receives a handover command sent by a network switching node, where the handover command is generated by the network switching node according to a handover response message sent by a target network node.

In S51, the generating and sending, by the network switching node, the handover command may include: generating, by the network switching node, a target key after receiving a handover request;

sending, by the network switching node, security information including the target key to the target network node, and receiving the handover response message sent by the target network node, where the handover response message is generated by the target network node according to the security information and is sent by the target network node; and sending, by the network switching node, the handover command to the mobile terminal, so that the mobile terminal accesses a target network.

Specifically, for the specific step of sending, by the network switching node, the handover command to the mobile terminal in S51, reference may be made to the corresponding steps in the embodiments corresponding to FIG. 1 and FIG. 3.

S52: The mobile terminal generates a security key according to a random value carried in the handover command and a local key of the mobile terminal.

The security key may specifically include a target key including a target cipher key and/or a target integrity protection key, or an intermediate key, where the target key or the intermediate key is used for performing secure communication processing after the mobile terminal accesses the target network. A derivative calculation formula adopted by the mobile terminal to generate the security key according to the random value carried in the handover command and the local key of the mobile terminal is the same as that adopted to derive the corresponding target key or intermediate key in the network switching node or the target network node.

S53: The mobile terminal accesses the target network according to the handover command and the security key.

Further, S52 may specifically be implemented in the following three manners, where the local key includes: a local cipher key $CK_{cs}$ and/or a local integrity protection key $IK_{cs}$.

In a first manner, a target key is generated according to the random value carried in the handover command and the local cipher key and/or the local integrity protection key, and is used as a security key for accessing an HSPA network; the target key includes a target cipher key $CK'_{ps}$ and/or a target integrity protection key $IK'_{ps}$.

Alternatively, in a second manner, an intermediate key is generated according to the random value carried in the handover command, the local cipher key and/or the local integrity protection key, and a preset derivation algorithm, and is used as a security key for accessing an LTE network.

Alternatively, in a third manner, a target key is generated according to the random value carried in the handover command, the local cipher key and/or the local integrity protection key, and a preset derivation algorithm, and an intermediate key is generated according to the target key and the random value that is carried in the handover command, and is used as a security key for accessing an LTE network.

In the second manner, a derivation process in which the mobile terminal calculates a corresponding intermediate key $K'_{asme}$ is the same as a derivation process of the MME mentioned in the foregoing embodiments, so that secure communication can be performed normally when the mobile terminal needs to access an LTE network.

The mobile terminal may specifically select a security key calculation manner according to a type which is of the target network and is indicated in the handover command When the handover command indicates that an HSPA network needs to be handed over to, the security key is generated in the first manner; when the handover command indicates that an LTE network needs to be handed over to, the second and third manners are used.

According to the embodiment of the present invention, security processing may be better completed in handover of the mobile terminal from the 3G network to the HSPA network or the LTE network in a case that the network switching node currently used in the network is not changed, thereby saving costs.

A processing process of the security processing method in a network handover process when the mobile terminal is handed over to the HSPA network or the LTE network in the embodiments corresponding to FIG. 1 and FIG. 2 is described in detail in the following.

When a mobile terminal UE is handed over from a 3G network to an HSPA network, the security processing method may specifically include:

S101: After receiving a handover request from a source network control node, an MSC server obtains a random value $NONCE_{MSC}$, where the random value $NONCE_{MSC}$ may be generated by the MSC server randomly.

S102: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S103: The MSC server sends security information including the target key to a target network node. The target network node in the HSPA network includes an SGSN.

S104: The SGSN sends the target key to a target access network node, and in the HSPA network, the target access network node includes a target RNC.

S105: The target RNC uses the target cipher key $CK'_{ps}$ and the target integrity protection key $IK'_{ps}$ that are included in the target key as a local cipher key and a local security protection key for the mobile terminal. A transparent container is generated and sent to the SGSN.

S106: The SGSN carries the transparent container in a handover response message, and sends the handover response message to a network switching node.

S107: The MSC server writes the random value $NONCE_{MSC}$ into the transparent container, carries the transparent container, in which the random value $NONCE_{MSC}$ is written, in a handover command, and sends the handover command to the mobile terminal through a source RNC; or, directly carries the $NONCE_{MSC}$ in a handover command, and sends the handover command to the mobile terminal through a source RNC, but does not write the random value $NONCE_{MSC}$ into the transparent container.

Definitely, S107 may also be: The random value $NONCE_{MSC}$ and the transparent container are sent to a source access network node, the source access network node writes the random value $NONCE_{MSC}$ into the transparent container, carries the transparent container in a handover command, and sends the handover command to the mobile terminal, or carries the $NONCE_{MSC}$ in a handover command, and sends the handover command to the mobile terminal.

S101 and S102 are S11; S104 to S106 are one type of specific steps of sending, by the target network node, the handover response message according to the security information; and S107 is S13. An operation of the mobile terminal UE includes the following steps:

S108: The mobile terminal accesses a target network, which specifically includes: after receiving the transparent container, generating, by the mobile terminal UE, a target key (a target cipher key $CK'_{ps}$ and a target integrity protection key $IK'_{ps}$) according to the $NONCE_{MSC}$ in the transparent container and a latest local key (a local cipher key $CK_{cs}$ and a local integrity protection key HQ by using an algorithm same as that of the MSC server, and performing a secure communication operation by using the target cipher key $CK'_{ps}$ and the target integrity protection key $IK'_{ps}$.

When the mobile terminal UE is handed over from a 3G network to an HSPA network, the security processing method may specifically further include:

S111: After receiving a handover request from a source network control node, an MSC server obtains a random value $NONCE_{MSC}$, where the random value $NONCE_{MSC}$ may be generated by the MSC server randomly.

S112: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S113: The MSC server sends security information including the target key and the random value $NONCE_{MSC}$ to a target network node. The target network node in the HSPA network includes an SGSN.

S114: The SGSN sends the target key and the random value $NONCE_{MSC}$ to a target access network node, and in the HSPA network, the target access network node includes a target RNC.

S115: The target RNC encapsulates the random value $NONCE_{MSC}$ in a transparent container, and sends the transparent container to the SGSN.

S116: The SGSN carries the transparent container in a handover response message, and sends the handover response message to the network switching node. The SGSN sends the transparent container in which the random value $NONCE_{MSC}$ is encapsulated to the MSC server.

S117: The MSC server carries the transparent container in a handover command, and sends the handover command to the mobile terminal. That is, the MSC server sends the transparent container in which the random value $NONCE_{MSC}$ is encapsulated to the UE through a source RNC.

S111 and S112 are S11; S114 to S116 are one type of specific steps of sending, by the target network node, the handover response message according to the security information; and S117 is S13. An operation of the mobile terminal UE includes the following steps:

S118: The mobile terminal accesses a target network, which specifically includes: after receiving the transparent container, generating, by the mobile terminal UE, a target key (a target cipher key $CK'_{ps}$ and a target integrity protection key $IK'_{ps}$) according to the $NONCE_{MSC}$ in the transparent container and a latest local key (a local cipher key $CK_{cs}$ and a local integrity protection key HQ by using an algorithm same as that of the MSC server, and performing a secure communication operation by using the target cipher key $CK'_{ps}$ and the target integrity protection key $IK'_{ps}$.

When the mobile terminal UE is handed over from a 3G network to an HSPA network, the security processing method may specifically further include:

S121: After receiving a handover request from a source network control node, an MSC server obtains a random value $NONCE_{MSC}$, where the random value $NONCE_{MSC}$ may be generated by the MSC server randomly.

S122: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S123: The MSC server sends security information including the local key, the target key and the random value $NONCE_{MSC}$ to a target network node. The target network node in the HSPA network includes an SGSN.

S124: The SGSN stores the target key, and sends the target key and the random value $NONCE_{MSC}$ to a target access network node. In the HSPA network, the target access network node includes a target RNC. The SGSN may directly delete the local key.

S125: The target RNC encapsulates the random value $NONCE_{MSC}$ in a transparent container, and sends the transparent container to the SGSN.

S126: The SGSN carries the transparent container in a handover response message, and sends the handover response message to the network switching node; that is, sends the transparent container in which the random value $NONCE_{MSC}$ is encapsulated to the MSC server.

In other embodiments, the following S124' to S126' may be used to sequentially replace S124 to S126.

S124': The SGSN generates a random value $NONCE_{SGSN}$, generates a target key according to the random value $NONCE_{SGSN}$ and a local key, and sends the target key and the random value $NONCE_{SGSN}$ to a target access network node; the SGSN may directly deletes the target key and the random value $NONCE_{MSC}$.

S125': The target RNC encapsulates the random value $NONCE_{SGSN}$ in a transparent container, and sends the transparent container to the SGSN.

S126': The SGSN carries the transparent container in a handover response message, and sends the handover response message to the network switching node. That is, the transparent container in which the random value $NONCE_{SGSN}$ is encapsulated is sent to the MSC server.

S127: The MSC server carries the transparent container in a handover command, and sends the handover command to the mobile terminal. That is, the MSC server sends the transparent container in which the random value $NONCE_{MSC}$ is encapsulated or the transparent container in which the random value $NONCE_{SGSN}$ is encapsulated to the UE, which may also be sent to the UE through a source RNC.

S121 and S122 are S11; S124 to S126 are one type of specific steps of sending, by the target network node, the handover response message according to the security information; and S127 is S13. An operation of the mobile terminal UE includes the following steps:

S128: The mobile terminal accesses a target network, which specifically includes: after receiving the transparent container, generating, by the mobile terminal UE, a target key (a target cipher key $CK'_{ps}$ and a target integrity protection key $IK'_{ps}$) according to the $NONCE_{MSC}$ in the transparent container and a latest local key (a local cipher key $CK_{cs}$ and a local integrity protection key $IK_{cs}$) by using an algorithm same as that of the MSC server, initiating a session transfer procedure according to the transparent container to access the HSPA network, and performing a secure communication operation by using the target cipher key $CK'_{ps}$ and the target integrity protection key $IK'_{ps}$.

Alternatively, corresponding to S124' to S126', the following is specifically included: generating a target key (a target cipher key $CK'_{ps}$ and a target integrity protection key $IK'_{ps}$) according to the random value $NONCE_{SGSN}$ in the transparent container and a latest local key (a local cipher key $CK_{cs}$ and a local integrity protection key $IK_{cs}$) by using an algorithm same as that of the MSC server, initiating a session transfer procedure according to the transparent container to access the HSPA network, and performing a secure communication operation by using the target cipher key $CK'_{ps}$ and the target integrity protection key $IK'_{ps}$.

When a mobile terminal UE is handed over from a 3G network to an LTE network, the security processing method specifically includes:

S201: After receiving a handover request from a source network control node, an MSC server obtains a random value $NONCE_{MSC}$, where the random value $NONCE_{MSC}$ may be generated by the MSC server randomly.

S202: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S203: The MSC server sends security information including the target key to a target network node. The target network node in the LTE network includes an MME.

S204: The MME generates an intermediate key according to the target key in the security information, where a specific derivation algorithm for generating the intermediate key may be: $K'_{asme} = CK'_{ps} \| IK'_{ps}$.

S205: The MME sends a command to notify a target access network node that the mobile terminal needs to be handed over to this network; where in the LTE network, the target access network node includes a macro base station eNB. The MME sends an NAS (non-access-stratum) transparent container to the eNB.

S206: The eNB generates a transparent container, and sends the transparent container to the MME. Specifically, the eNB may generate a transparent container including the NAS transparent container, and sends the transparent container to the MME.

S207: The MME carries the transparent container in a handover response message, and sends the handover response message to the network switching node MSC server.

S208: The MSC server writes the random value $NONCE_{MSC}$ into the transparent container, carries the transparent container into which the random value $NONCE_{MSC}$ is written in a handover command, and sends the handover command to the mobile terminal. The transparent container into which the random value $NONCE_{MSC}$ is written may be sent to the mobile terminal through a source RNC. Alternatively, the $NONCE_{MSC}$ is carried in a handover command, and the handover command is sent to the mobile terminal.

Definitely, S208 may also be: The random value $NONCE_{MSC}$ and the transparent container are sent to a source access network node, the source access network node writes the random value $NONCE_{MSC}$ into the transparent container, carries the transparent container in a handover command, and sends the handover command to the mobile terminal, or carries the $NONCE_{MSC}$ in a handover command, and sends the handover command to the mobile terminal.

S201 and S202 are S11; S204 to S207 are one type of specific steps of sending, by the target network node, the handover response message according to the security information; and S208 is S13. An operation of the mobile terminal UE includes the following steps:

S209: The mobile terminal accesses a target network, which specifically includes: after receiving the transparent container, generating, by the mobile terminal UE, a target key (a target cipher key $CK'_{ps}$ and a target integrity protection key $IK'_{ps}$) according to the $NONCE_{MSC}$ in the transparent container and a latest local key (a local cipher key $CK_{cs}$ and a local integrity protection key $IK_{cs}$) by using an algorithm same as that of the MSC server, further generating an intermediate key $K'_{asme}=CK'_{ps}||IK'_{ps}$, and performing a secure communication operation by using intermediate key.

When a mobile terminal UE is handed over from a 3G network to an LTE network, the security processing method may specifically further include:

S211: After receiving a handover request from a source network control node, an MSC server obtains a random value $NONCE_{MSC}$, where the random value $NONCE_{MSC}$ may be generated by the MSC server randomly.

S212: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S213: The MSC server sends security information including the target key to a target network node. The target network node in the LTE network includes an MME.

S214: The MME generates a random value $NONCE_{MME}$, and generates an intermediate key according to the random value $NONCE_{MME}$ and the target key; where a derivation algorithm for generating the intermediate key by the MME may specifically be: $K'_{asme}=KDF(CK'_{ps}, IK'_{ps}, NONCE_{MME})$.

S215: The MME sends the random value $NONCE_{MME}$ to a target access network node eNB. Specifically, the MME may encapsulate the random value $NONCE_{MME}$ in an NAS transparent container, and send the NAS transparent container to the eNB.

S216: The eNB encapsulates the random value $NONCE_{MME}$ in a transparent container, and sends the transparent container to the MME. Specifically, the eNB may generate a transparent container including the NAS transparent container, and send the transparent container to the MME.

S217: The MME carries the transparent container in a handover response message, and sends the handover response message to the network switching node. That is, the transparent container in which the random value $NONCE_{MME}$ is encapsulated is sent to the MSC server.

S218: The MSC server writes the random value $NONCE_{MSC}$ into the transparent container, carries the transparent container into which the random value $NONCE_{MSC}$ is written in a handover command, and sends the handover command to the mobile terminal. That is, the random value $NONCE_{MME}$ and the random value $NONCE_{MSC}$ are encapsulated in the transparent container. Alternatively, the $NONCE_{MSC}$ is directly carried in a handover command, and the handover command is sent to the mobile terminal.

Definitely, S218 may also be: The random value $NONCE_{MSC}$ and the transparent container are sent to a source access network node, and the source access network node writes the random value $NONCE_{MSC}$ into the transparent container, carries the transparent container in a handover command, and sends the handover command to the mobile terminal, or the source access network node carries the $NONCE_{MSC}$ in a handover command, and sends the handover command to the mobile terminal.

S211 and S212 are S11; S214 to S217 are one type of specific steps of sending, by the target network node, the handover response message according to the security information; and S218 is S13. An operation of the mobile terminal UE includes the following steps:

S219: The mobile terminal accesses a target network, which specifically includes: after receiving the transparent container, generating, by the mobile terminal UE, a target key security key identifier including a target cipher key $CK'_{ps}$ and a target integrity protection key according to the $NONCE_{MSC}$ in the transparent container and a latest local key, that is, a local cipher key $CK_{cs}$ and a local integrity protection key $IK_{cs}$, by using an algorithm same as that of the MSC server. Then, according to the random value $NONCE_{MME}$ in the transparent container and by using a derivation algorithm same as that of the MME, an intermediate key $K'_{asme}$ is obtained through derivation.

When a mobile terminal UE is handed over from a 3G network to an LTE network, the security processing method may specifically further include:

S221: After receiving a handover request from a source network control node, an MSC server obtains a random value $NONCE_{MSC}$, where the random value $NONCE_{MSC}$ may be generated by the MSC server randomly.

S222: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S223: The MSC server sends security information including the target key and the random value $NONCE_{MSC}$ to a target network node. The target network node in the LTE network includes an MME.

S224: The MME generates an intermediate key specifically including $K'_{asme}=CK'_{ps}$ according to the target key in the security information. Alternatively, an intermediate key specifically including $K'_{asme}=KDF(CK'_{ps}, IK'_{ps}, NONCE_{MSC})$ is generated according to the target key and the random value $NONCE_{MSC}$ that are in the security information.

S225: The MME sends the random value $NONCE_{MSC}$ to a target access network node. In the LTE network, the target access network node includes a target eNB. Specifically, the MME may encapsulate the random value $NONCE_{MSC}$ in an NAS transparent container, and send the NAS transparent container to the eNB.

S226: The target eNB encapsulates the random value $NONCE_{MSC}$ in a transparent container, and sends the transparent container to the MME. Specifically, the eNB may generate a transparent container including the NAS transparent container, and send the transparent container to the MME.

S227: The MME includes the transparent container in a handover response message, and sends the handover response message to the network switching node. That is, the MME sends the transparent container in which the random value $NONCE_{MSC}$ is encapsulated to the MSC server.

S228: The MSC server carries the transparent container in which the random value $NONCE_{MSC}$ is encapsulated in a handover command, and sends the handover command to the mobile terminal.

That is, the random value $NONCE_{MSC}$, which is sent to the UE, is encapsulated in the transparent container. Similarly, the transparent container in which the random value $NONCE_{MSC}$ is encapsulated may be sent to the UE through a source RNC.

S221 and S222 are S11; S224 to S227 are one type of specific steps of sending, by the target network node, the handover response message according to the security information; and S228 is S13. An operation of the mobile terminal UE includes the following steps:

S229: The mobile terminal accesses a target network, which specifically includes: after receiving the transparent container, generating, by the mobile terminal UE, a target key (a target cipher key $CK'_{ps}$ and a target integrity protection key $IK'_{ps}$) according to the $NONCE_{MSC}$ in the transparent container and a latest local key (a local cipher key $CK_{cs}$ and a local integrity protection key $IK_{cs}$) by using an algorithm same as that of the MSC server, and obtaining an intermediate key $K'_{asme}$ according to a derivation formula $K'_{asme}=CK'_{ps}\|IK'_{ps}$ or $K'_{asme}=KDF$ ($CK'_{ps}$, $IK'_{ps}$, $NONCE_{MSC}$) same as that of the MME.

When a mobile terminal UE is handed over from a 3G network to an LTE network, the security processing method may specifically further include:

S231: After receiving a handover request from a source network control node, an MSC server obtains a random value $NONCE_{MSC}$, where the random value $NONCE_{MSC}$ may be generated by the MSC server randomly.

S232: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S233: The MSC server sends security information including the target key and the random value $NONCE_{MSC}$ to a target network node. The target network node in the LTE network includes an MME.

S234: The MME generates a random value $NONCE_{MME}$, and generates an intermediate key according to the random value $NONCE_{MME}$ and the target key that is in the security information; where a specific formula for generating the intermediate key by the MME includes: $K'_{asme}=KDF$ ($CK'_{ps}$, $IK'_{ps}$, $NONCE_{MME}$).

S235: The MME sends the random value $NONCE_{MSC}$ and the random value $NONCE_{MME}$ to a target access network node. In the LTE network, the target access network node includes a target eNB. Specifically, the MME may encapsulate the random value $NONCE_{MSC}$ and the random value $NONCE_{MME}$ in an NAS transparent container, and send the NAS transparent container to the eNB.

S236: The target eNB encapsulates the random value $NONCE_{MSC}$ and the random value $NONCE_{MME}$ in the transparent container, and sends the transparent container to the MME. Specifically, the eNB may generate a transparent container including the NAS transparent container, and send the transparent container to the MME.

S237: The MME includes the transparent container in a handover response message, and sends the handover response message to the network switching node. That is, the MME sends the transparent container in which the random value $NONCE_{MSC}$ and the random value $NONCE_{MME}$ are encapsulated to the MSC server.

S238: The MSC server carries the transparent container in which the random value $NONCE_{MSC}$ and the random value $NONCE_{MME}$ are encapsulated in a handover command, and sends the handover command to the mobile terminal. That is, the random value $NONCE_{MSC}$ and the random value $NONCE_{MME}$ are encapsulated in the transparent container sent to the UE. Similarly, the transparent container in which the random value $NONCE_{MSC}$ and the random value $NONCE_{MME}$ are encapsulated may be sent to the UE through a source RNC.

S231 and S232 are S11; S234 to S237 are one type of specific steps of sending, by the target network node, the handover response message according to the security information; and S238 is S13. An operation of the mobile terminal UE includes the following steps:

S239: The mobile terminal accesses a target network, which specifically includes: after receiving the transparent container, generating, by the mobile terminal UE, a target key security key identifier including a target cipher key $CK'_{ps}$ and a target integrity protection key according to the $NONCE_{MSC}$ in the transparent container and a latest local key, that is, a local cipher key $CK_{cs}$ and a local integrity protection key $IK_{cs}$, by using an algorithm same as that of the MSC server. An intermediate key $K'_{asme}$ is obtained according to a derivation formula $K'_{asme}=KDF$ ($CK'_{ps}IK'_{ps}$, $NONCE_{MME}$).

When a mobile terminal UE is handed over from a 3G network to an LTE network, the security processing method may specifically further include:

S241: After receiving a handover request from a source network control node, an MSC server obtains a random value $NONCE_{MSC}$, where the random value $NONCE_{MSC}$ may be generated by the MSC server randomly.

S242: The MSC server generates a target key according to the random value $NONCE_{MSC}$ and according to a local key, where the local key includes a local cipher key $CK_{cs}$ and/or a local integrity protection key $IK_{cs}$, and the target key includes a target cipher key $CK'_{ps}$ and/or a target integrity protection key $IK'_{ps}$.

S243: The MSC server sends security information including the local key, the target key and the random value $NONCE_{MSC}$ to a target network node. The target network node in the LTE network includes an MME.

S244: The MME generates an intermediate key according to the target key, where a derivation formula may specifically be an intermediate key $K'_{asme}=CK'_{ps}\|IK'_{ps}$. Alternatively, an intermediate key is generated according to the target key and the random value $NONCE_{MSC}$, where a derivation formula is an intermediate key $K'_{asme}=KDF$ ($CK'_{ps}$, $IK'_{ps}$, $NONCE_{MSC}$); the MME may directly delete the local key.

S245: The MME sends the random value $NONCE_{MSC}$ to a target access network node. In the LTE network, the target access network node includes a target eNB. Specifically, the MME may encapsulate the random value $NONCE_{MSC}$ in an NAS transparent container, and send the NAS transparent container to the eNB.

S246: The target eNB encapsulates the random value $NONCE_{MSC}$ in a transparent container, and sends the transparent container to the MME. Specifically, the eNB may generate a transparent container including the NAS transparent container, and send the transparent container to the MME.

S247: The MME includes the transparent container in a handover response message, and sends the handover response message to the network switching node; that is, sends the transparent container in which the random value $NONCE_{MSC}$ is encapsulated to the MSC server.

In other embodiments, S244 to S247 may be sequentially replaced with the following S244' to S247'.

S244': The MME generates a random value $NONCE_{MME}$, and generates an intermediate key according to the random value $NONCE_{MME}$ and the local key; where a derivation formula may specifically include: an intermediate key $K'_{asme}=KDF$ ($CK'_{cs}IK_{cs}$, $NONCE_{MME}$). The MME may directly delete the target key and the random value $NONCE_{MSC}$.

S245': The MME sends the random value $NONCE_{MME}$ to a target access network node, that is, a target eNB.

S246': The target eNB encapsulates the random value NONCE$_{MME}$ in a transparent container, and sends the transparent container to the MME.

S247': The MME includes the transparent container in a handover response message, and sends the handover response message to the network switching node.

S248: The MSC server carries the transparent container, in which the random value NONCE$_{MME}$ is encapsulated, in a handover command, and sends the handover command to the mobile terminal. That is, the random value NONCE$_{MME}$ is encapsulated in the transparent container sent to the UE. Similarly, the transparent container in which the random value NONCE$_{MSC}$ is encapsulated may be sent to the UE through a source RNC.

S241 and S242 are S11; S244 to S247 are one type of specific steps of sending, by the target network node, the handover response message according to the security information; and S248 is S13. An operation of the mobile terminal UE includes the following steps:

S249: The mobile terminal accesses a target network, which specifically includes: after receiving the transparent container, generating, by the mobile terminal UE, an intermediate key according to the target key and the random value NONCE$_{MSC}$, where a derivation formula is an intermediate key K=$_{asme}$=KDF (CK'$_{ps}$, IK'$_{PS}$NONCE$_{MSC}$).

Corresponding to S244' to S247', according to the NONCE$_{MME}$ in the transparent container and a latest local key, that is, a local cipher key CK$_{cs}$ and a local integrity protection key IK$_{cs}$, and according to a derivation formula K'$_{asme}$=KDF (CK$_{ps}$, IK$_{ps}$, NONCE$_{MME}$), the intermediate key K'$_{asme}$ is obtained.

It should be noted that the technologies, through which the foregoing corresponding node generates the transparent container and the mobile terminal accesses the corresponding target network according to the transparent container, are the prior art, and are not repeatedly described here.

It should be noted that, after the MME obtains the intermediate key K'$_{asme}$, the MME further derives a key K$_{eNB}$ according to K'$_{asme}$ and sends the key K$_{eNB}$ to the eNB, and the mobile terminal may also derive a key K$_{eNB}$ according to K'$_{asme}$, processes of which are all in the prior art, which are not concerned in the embodiment of the present invention, and are not repeatedly described here.

According to the embodiment of the present invention, security processing may be better completed in handover of the mobile terminal from the 3G network to the HSPA network or the LTE network in a case that the network switching node currently used in the network is not changed, thereby saving costs.

A processing process of the security processing method in a network handover process when the mobile terminal is handed over to the HSPA network or the LTE network in the embodiments corresponding to FIG. 3 and FIG. 4 is described in detail in the following.

When a mobile terminal UE is handed over from a 3G network to an HSPA network, the security processing method may specifically include:

S201: After receiving a handover request, an MSC server sends security information including a local key to a target network node. The target network node in the HSPA network includes an SGSN.

S202: The SGSN generates a random value NONCE$_{SGSN}$, and generates a target key according to the random value NONCE$_{SGSN}$ and the local key.

S203: The SGSN sends the target key to a target access network node, and in the HSPA network, the target access network node includes a target RNC.

S204: The target RNC encapsulates the random value NONCE$_{SGSN}$ in a transparent container, and sends the transparent container to the SGSN.

S205: The SGSN carries the transparent container in a handover response message, and sends the handover response message to a network switching node.

S206: The MSC server carries the transparent container in a handover command, and sends the handover command to the mobile terminal. That is, the MSC server sends the transparent container in which the random value NONCE$_{SGSN}$ is encapsulated to the mobile terminal, which may be specifically sent to the mobile terminal through a source RNC.

S202 to S205 are one type of specific steps of sending, by the target network node, the handover response message according to the security information; and S206 is S23. An operation of the mobile terminal UE includes the following steps:

S207: The mobile terminal accesses a target network, which specifically includes: after receiving the transparent container, generating, by the mobile terminal UE, a target key security key identifier, that is, generating a target cipher key CK'$_{ps}$ and a target integrity protection key IK'$_{ps}$, according to the NONCE$_{SGSN}$ in the transparent container and a latest local key, that is, a local cipher key CK'$_{cs}$ and a local integrity protection key IK$_{cs}$ by using an algorithm same as that of the SGSN, and performing a secure communication operation by using the target cipher key CK'$_{ps}$ and the target integrity protection key IK'$_{ps}$.

When a mobile terminal UE is handed over from a 3G network to an LTE network, the security processing method may specifically include:

S211: After receiving a handover request, an MSC server sends security information including a local key to a target network node. The target network node in the LTE network includes an MME. The local key includes a local cipher key identifier CK$_{cs}$ and a local integrity protection key identifier IK$_{cs}$.

S212: The MME generates a random value NONCE$_{MME}$, and generates an intermediate key according to the random value NONCE$_{MME}$ and the local key.

Specifically, a derivation algorithm of the intermediate key includes: K'$_{asme}$=KDF (CK$_{cs}$, IK$_{cs}$, NONCE$_{MME}$).

S213: The MME sends the random value NONCE$_{MME}$ to a target access network node. Specifically, the MME may encapsulate the random value NONCE$_{MME}$ in an NAS transparent container, and send the NAS transparent container to a target access network node eNB.

S214: The target access network node generates a transparent container, encapsulates the random value NONCE$_{MME}$ in the transparent container, and sends the transparent container to the MME. Specifically, the target access network node eNB may generate a transparent container including the NAS transparent container, and send the transparent container to the MME.

S215: The MME carries the transparent container in a handover response message, and sends the handover response message to the network switching node. That is, the transparent container in which the random value NONCE$_{MME}$ is encapsulated is sent to the MSC server.

S216: The MSC server carries the transparent container in a handover command, and sends the handover command to the mobile terminal. That is, the MSC server sends the transparent container in which the random value NONCE$_{MME}$ is encapsulated to the mobile terminal. The MSC server may send the transparent container in which the random value NONCE$_{MME}$ is encapsulated to the mobile terminal through a source RNC.

S212 to S215 are one type of specific steps of sending, by the target network node, the handover response message according to the security information; and S216 is S23. An operation of the mobile terminal UE includes the following steps:

S217: The mobile terminal accesses a target network, which specifically includes: after receiving the transparent container, generating, by the mobile terminal UE, an intermediate key K'$_{asme}$ according to the NONCE$_{MME}$ in the transparent container and a latest local key, that is, a local cipher key CK$_{cs}$ and a local integrity protection key IK$_{cs}$ by using an algorithm same as that of the MME.

According to the embodiment of the present invention, security processing may be better completed in handover of the mobile terminal from the 3G network to the HSPA network or the LTE network in a case that the network switching node currently used in the network is not changed, thereby saving costs.

Figure 6:
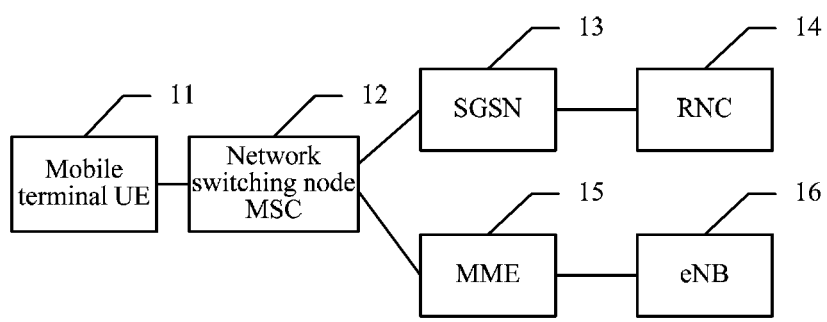
FIG. 6 is a schematic structural composition diagram of a security processing system in a network handover process according to an embodiment of the present invention.

A security processing system in a network handover process according to the present invention is described in detail in the following. Referring to FIG. 6, FIG. 6 is a schematic structural composition diagram of an embodiment of a security processing system in a network handover process according to the present invention. In this embodiment, a user enters an HSPA network or an LTE network from a 3G network in a process of communicating through a mobile terminal, and the system includes: a mobile terminal 11, a network switching node 12, a target network node SGSN13, a target access network node RNC14, a target network node MME15, and a target access network node eNB16. Specifically, the network switching node 12 may be an MSC server, and the target network node includes an SGSN in an HSPA network or an MME in an LTE network.

Figure 7:
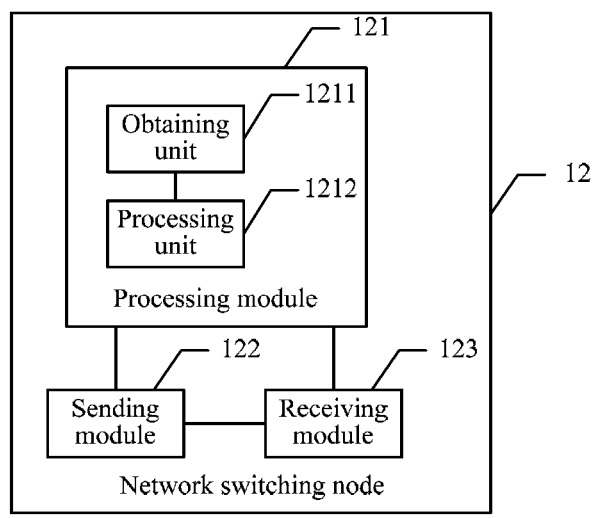
FIG. 7 is a schematic structural composition diagram of a network switching node in FIG. 6.

Referring to FIG. 7, the network switching node 12 may specifically include:

a processing module 121, configured to generate a target key after a handover request is received;

a sending module 122, configured to send security information including the target key to a target network node after the processing module 121 generates the target key; and a receiving module 123, configured to receive the handover request, and configured to receive a handover response message sent by the target network node.

The sending module 122 is further configured to send a handover command to the mobile terminal 11, so that the mobile terminal 11 accesses a target network.

The mobile terminal 11 accesses the target network according to the handover command.

Further, the processing module 121 includes:

an obtaining unit 1211, configured to obtain a random value NONCE$_{MSC}$ after a handover request from a source network control node is received; that is, when the mobile terminal 11 undergoes network handover, a source network control node connected to the mobile terminal may send a handover request to the network switching node 12. The random value NONCE$_{MSC}$ obtained by the obtaining unit 1211 may be generated randomly by the obtaining unit 1211, or may also be generated by the source network control node and sent to the network switching node 12 by the source network control node and obtained by the obtaining unit 1211; and a processing unit 1212, configured to generate a target key according to the random value NONCE$_{MSC}$ and a local key of the network switching node 12, where the local key includes a local cipher key and/or a local integrity protection key, and the target key includes a target cipher key and/or a target integrity protection key.

Further specifically, when the target network node is the SGSN13, the receiving module 123 is specifically configured to receive a handover response message which is sent by the SGSN13 and carries a transparent container. The transparent container is generated by the RNC14 after the SGSN13 sends the target key to the target access network node RNC14.

When the target network node is a mobility management entity MME15, the receiving module 123 is specifically configured to receive a handover response message which is sent by the MME15 and carries a transparent container, where the transparent container is generated by the eNB 16 and is sent to the MME 15 by the eNB 16; or, configured to receive a handover response message which is sent by the MME15 and carries a transparent container, where the transparent container is generated by the eNB 16 and is sent to the MME15 by the eNB16, the transparent container includes a random value NONCE$_{MME}$, the eNB16 encapsulates the random value NONCE$_{MME}$ in the transparent container, and the NONCE$_{MME}$ is generated by the MME15 after the security information is received and is sent to the eNB16 by the MME15.

In a case that the network switching node 12 does not send the random value NONCE$_{MSC}$ obtained by the network switching node 12 to the target network node SGSN13 or MME15, the sending module 122 is specifically configured to carry the random value NONCE$_{MSC}$ in a handover command, and send the handover command to the mobile terminal 11; alternatively, the sending module 122 is specifically configured to send the random value NONCE$_{MSC}$ and the transparent container to a source access network node, so that the source access network node carries the random value NONCE$_{MSC}$ and the transparent container in a handover command, and sends the handover command to the mobile terminal 11; alternatively, the sending module 122 is specifically configured to send the NONCE$_{MSC}$ and the transparent container to a source access network node, so that the source access network node ignores the NONCE$_{MSC}$, carries the transparent container in a handover command, and sends the handover command to the mobile terminal 11.

Further specifically, the security information sent by the sending module 122 to the target network node further includes the random value NONCE$_{MSC}$.

When the target network node is the SGSN13, the receiving module 123 is specifically configured to receive a handover response message which is sent by the SGSN13 and carries a transparent container. The transparent container is generated by the target access network node RNC14 and is sent to the SGSN13 by the target access network node RNC14. The transparent container includes the random value NONCE$_{MSC}$. The target access network node RNC14 encapsulates the random value NONCE$_{MSC}$ in the transparent container. The NONCE$_{MSC}$ is sent by the SGSN13 to the RNC14.

When the target network node is the mobility management entity MME15, the receiving module 123 is specifically configured to receive a handover response message which is sent by the MME15 and carries a transparent container, where the transparent container includes the random value NONCE$_{MSC}$, and the NONCE$_{MSC}$ is sent by the MME15 to the eNB16; alternatively, the receiving module 123 is specifically configured to receive a handover response message which is sent by the MME15 and carries a transparent container, where the transparent container includes the random value $NONCE_{MSC}$ and the random value $NONCE_{MME}$, the $NONCE_{MSC}$ is sent by the MME15 to the eNB16, and the $NONCE_{MME}$ is generated by the MME15 after the security information is received and the $NONCE_{MME}$ is sent to the target access network node by the MME15; alternatively, the receiving module 123 is specifically configured to receive a handover response message which is sent by the MME and carries a transparent container, where the transparent container is generated by the target access network node and is sent to the MME by the target access network node, the transparent container includes the random value $NONCE_{MME}$, and the $NONCE_{MME}$ is generated by the MME after the security information is received and the $NONCE_{MME}$ is sent to the target access network node by the MME.

Further specifically, the security information sent by the sending module 122 to the target network node further includes the random value $NONCE_{MSC}$ and the local key.

When the target network node is the SGSN13, the receiving module 123 is specifically configured to receive a handover response message which is sent by the SGSN13 and carries a transparent container. The transparent container is generated by the RNC14 and is sent to the SGSN13 by the RNC14. The transparent container includes the random value $NONCE_{MSC}$. The target access network node RNC14 encapsulates the random value $NONCE_{MSC}$ in the transparent container. The random value $NONCE_{MSC}$ is sent by the SGSN13 to the RNC14.

When the target network node is the MME15, the receiving module 123 is specifically configured to receive a handover response message which is sent by the MME15 and carries a transparent container. The transparent container is generated by the eNB16 and is sent to the MME15 by the eNB16. The transparent container includes the random value $NONCE_{MSC}$. The target access network node eNB16 encapsulates the random value $NONCE_{MSC}$ in the transparent container. The $NONCE_{MSC}$ is sent by the MME15 to the eNB 16.

Alternatively:

When the target network node is the SGSN13, the receiving module 123 is specifically configured to receive a handover response message which is sent by the SGSN13 and carries a transparent container. The transparent container is generated by the RNC14 and is sent to the SGSN13 by the RNC14. The transparent container includes a random value $NONCE_{SGSN}$. The target access network node RNC14 encapsulates the random value $NONCE_{SGSN}$ in the transparent container. The random value $NONCE_{SGSN}$ is generated by the SGSN13 after the security information is received and the random value $NONCE_{SGSN}$ is sent to the RNC14 by the SGSN13.

When the target network node is the MME15, the receiving module 123 is specifically configured to receive a handover response message which is sent by the MME15 and carries a transparent container. The transparent container is generated by the eNB and is sent to the MME15 by the eNB. The transparent container includes the random value $NONCE_{MME}$. The target access network node eNB16 encapsulates the random value $NONCE_{MME}$ in the transparent container. The random value $NONCE_{MME}$ is generated by the MME15 after the security information is received and the random value $NONCE_{MME}$ is sent to the eNB16 by the MME15.

In a case that the network switching node 12 sends the random value $NONCE_{MSC}$ obtained by the network switching node 12 to the target network node SGSN13 or MME15, the sending module 122 is specifically configured to carry the transparent container in a handover command, and send the handover command to the mobile terminal 11; alternatively, the sending module 122 is specifically configured to send the transparent container to the mobile terminal 11 through the source access network node.

Figure 8:
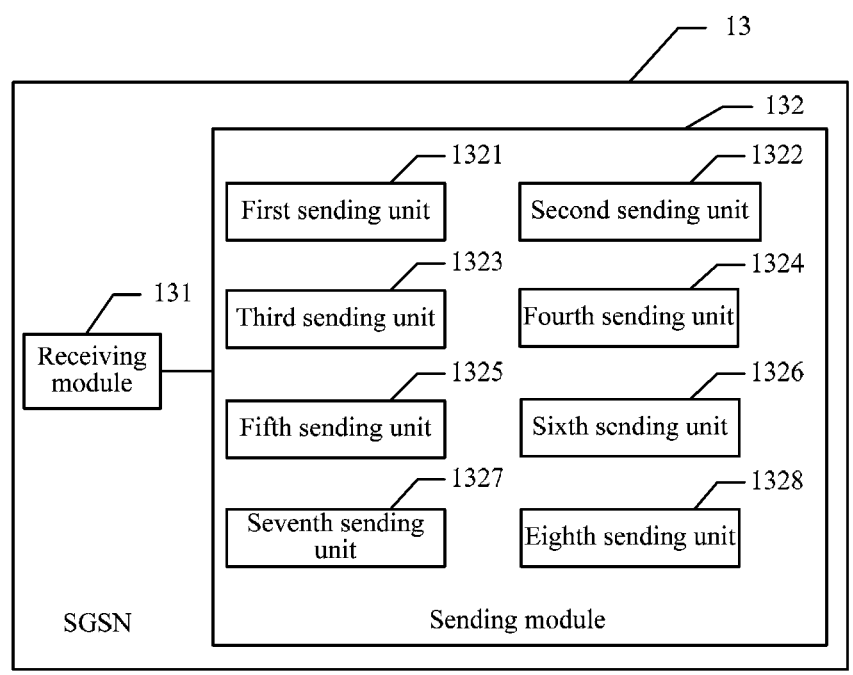
FIG. 8 is a schematic structural composition diagram of a target network node SGSN in FIG. 6.

Referring to FIG. 8, the SGSN13 may specifically include:

a receiving module 131, configured to receive security information which is sent by the network switching node 12 and includes a target key, where the target key is generated by the network switching node after a handover request is received; and a sending module 132, configured to send a handover response message to the network switching node 12, so that the network switching node 12 sends a handover command to the mobile terminal for the mobile terminal 11 to access a target network, that is, an HSPA network.

Definitely, in order to be distinguished from the sending module 122 and the receiving module 123 that are in the network switching node, the receiving module 131 may be named as a target receiving module, and the sending module 122 may be named as a target sending module.

Further specifically, the sending module 132 may include:

a first sending unit 1321, configured to send the target key to the target access network node, so that the target access network node generates a transparent container after receiving the target key, and the target access network node subsequently performs, according to the target key, secure communication processing on the mobile terminal handed over to the target network; and a second sending unit 1322, configured to, when the receiving module 131 receives the transparent container sent by the target access network node, that is, the RNC14, carry the transparent container in a handover response message, and send the handover response message to the network switching node.

Further specifically, when the security information received by the receiving module 131 and sent by the network switching node 12 further includes a random value $NONCE_{MSC}$, the sending module 132 may further include:

a third sending unit 1323, configured to send the target key and the random value $NONCE_{MSC}$ to the target access network node, that is, the RNC14, so that the target access network node, that is, the RNC14 generates a transparent container in which the random value $NONCE_{MSC}$ is encapsulated, and the target access network node, that is, the RNC14 subsequently performs, according to the target key, secure communication processing on the mobile terminal handed over to the target network; and a fourth sending unit 1324, configured to, when the receiving module 131 receives the transparent container sent by the target access network node, that is, the RNC14, carry the transparent container in a handover response message, and send the handover response message to the network switching node 12.

Further specifically, when the security information received by the receiving module 131 and sent by the network switching node 12 further includes a random value $NONCE_{MSC}$ and a local key, the sending module 132 may further include:

a fifth sending unit 1325, configured to send the target key and the random value $NONCE_{MSC}$ to the target access network node, that is, the RNC14, so that the RNC14 encapsulates the random value $NONCE_{MSC}$ in a transparent container, and the RNC14 subsequently performs, according to the target key, secure communication processing on the mobile terminal handed over to the target network; and a sixth sending unit 1326, configured to, when the receiving module 131 receives the transparent container sent by the RNC14, carry the transparent container in a handover response message, and send the handover response message to the network switching node 12;

or includes:

a seventh sending unit 1327, configured to generate a random value $NONCE_{SGSN}$, generate a new target key according to the random value $NONCE_{SGSN}$ and a local key, and send the new target key and the random value $NONCE_{SGSN}$ to the target access network node RNC14, so that the RNC14 generates a transparent container in which the random value $NONCE_{SGSN}$ is encapsulated, and the RNC14 subsequently performs, according to the target key, secure communication processing on the mobile terminal handed over to the target network; and an eighth sending unit 1328, configured to, when the receiving module 131 receives the transparent container, in which the random value $NONCE_{SGSN}$ is encapsulated, sent by the RNC14 to the SGSN, carry the transparent container in a handover response message, and send the handover response message to the network switching node 12.

Figure 9:
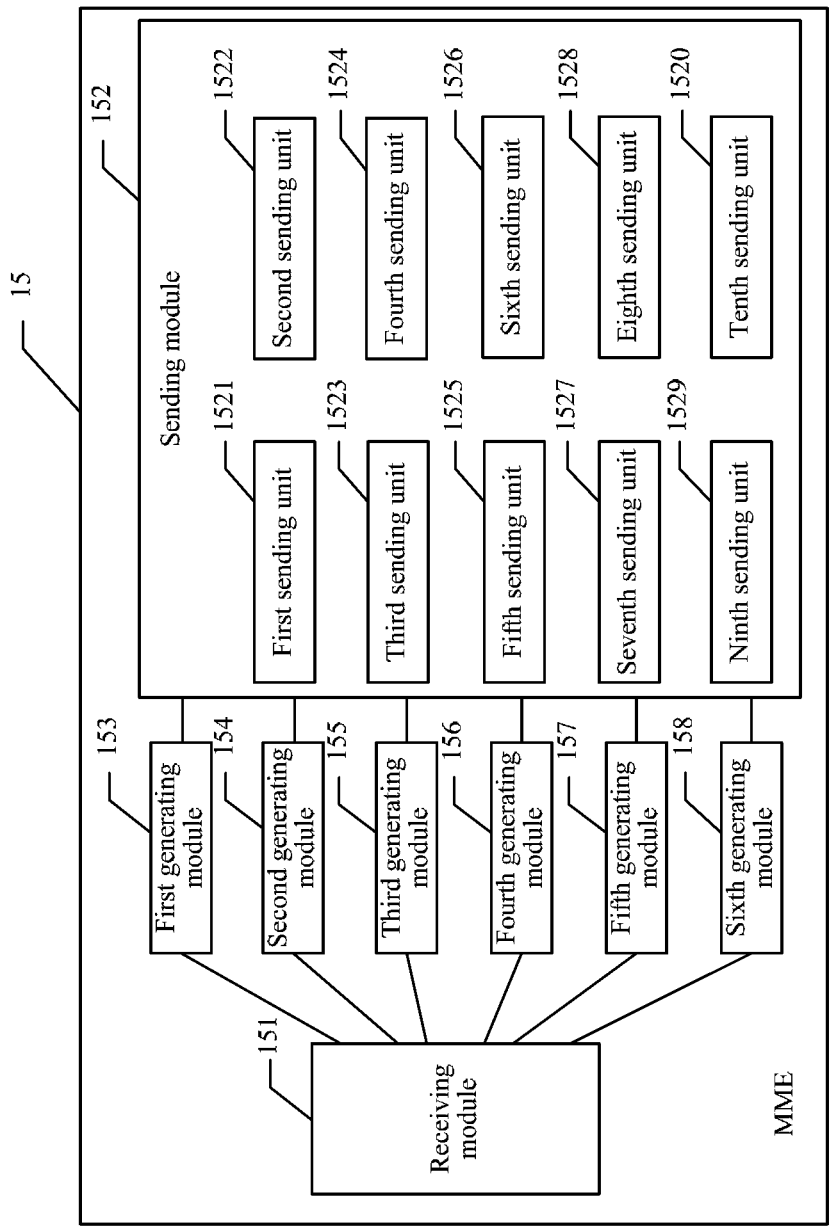
FIG. 9 is a schematic structural composition diagram of a target network node MME in FIG. 6.

Referring to FIG. 9, the mobility management entity MME15 may specifically include:

a receiving module 151, configured to receive security information which is sent by the network switching node 12 and includes a target key, where the target key is generated by the network switching node after a handover request is received; and a sending module 152, configured to send a handover response message to the network switching node 12, so that the network switching node 12 sends a handover command to the mobile terminal 11, and the mobile terminal 11 accesses a target network, that is, an LTE network.

Definitely, in order to be distinguished from the sending module 122 and the receiving module 123 that are in the network switching node 12 and from the receiving module 131 and the sending module 122 that are in the SGSN13, the receiving module 151 may be named as a first target receiving module, and the sending module 152 may be named as a first target sending module.

Further specifically, the MME15 may further include: a first generating module 153, configured to generate an intermediate key according to the target key in the security information, so that the MME subsequently performs, according to the intermediate key, secure communication processing on the mobile terminal handed over to the target network. 102631 The receiving module 151 is further configured to receive a transparent container. The transparent container is generated and sent by the target access network node eNB 16.

The sending module 152 is specifically configured to carry the transparent container in a handover response message, and send the handover response message to the network switching node 12.

Further specifically, the MME15 may further include: a second generating module 154, configured to generate a random value $NONCE_{MME}$, and generate an intermediate key according to the random value $NONCE_{MME}$ and the target key, so that the MME subsequently performs, according to the intermediate key, secure communication processing on the mobile terminal handed over to the target network.

The sending module 152 may include:

a first sending unit 1521, configured to send the random value $NONCE_{MME}$ to the target access network node eNB16, so that the eNB16 encapsulates the random value $NONCE_{MME}$ in the transparent container; and a second sending unit 1522, configured to, when the receiving module 151 receives the transparent container sent by the eNB16, carry the transparent container in a handover response message, and send the handover response message to the network switching node 12, where the random value $NONCE_{MME}$ is encapsulated in the transparent container.

Further specifically, when the security information received by the receiving module 151 and sent by the network switching node further includes the random value $NONCE_{MSC}$, the MME15 may further include: a third generating module 155, configured to generate an intermediate key according to the target key in the security information, so that the MME15 subsequently performs, according to the intermediate key, secure communication processing on the mobile terminal handed over to the target network; or generate an intermediate key according to the target key and the random value $NONCE_{MSC}$ that are in the security information, so that the MME15 subsequently performs, according to the intermediate key, secure communication processing on the mobile terminal 11 handed over to the target network.

The sending module 152 may include:

a third sending unit 1523, configured to send the random value $NONCE_{MSC}$ to the target access network node eNB16, so that the eNB16 generates a transparent container in which the random value $NONCE_{MSC}$ is encapsulated; and a fourth sending unit 1524, configured to, when the receiving module 151 receives the transparent container sent by the target access network node, include the transparent container in a handover response message, and send the handover response message to the network switching node 12.

Further specifically, when the security information received by the receiving module 151 and sent by the network switching node 12 further includes the random value $NONCE_{MSC}$, the MME15 further includes: a fourth generating module 156, configured to generate a random value $NONCE_{MME}$, and generate an intermediate key according to the random value $NONCE_{MME}$ and the target key that is in the security information, so that the MME subsequently performs, according to the intermediate key, secure communication processing on the mobile terminal handed over to the target network.

The sending module 152 may include:

a fifth sending unit 1525, configured to send the random value $NONCE_{MME}$ and/or the random value $NONCE_{MSC}$ to the target access network node eNB16, so that the eNB16 generates a transparent container in which the random value $NONCE_{MME}$ and/or the random value $NONCE_{MSC}$ is encapsulated, and sends the transparent container to the MME15; and a sixth sending unit 1526, configured to, when the receiving module 151 receives the transparent container sent by the eNB 16, include the transparent container in a handover response message, and send the handover response message to the network switching node 12.

Further specifically, when the security information received by the receiving module 151 and sent by the network switching node 12 further includes the random value $NONCE_{MSC}$ and a local key, the MME15 further includes:

a fifth generating module 157, configured to generate an intermediate key according to the target key, so that the MME subsequently performs, according to the intermediate key, secure communication processing on the mobile terminal handed over to the target network; or, generate an intermediate key according to the target key and the random value $NONCE_{MSC}$, so that the MME subsequently performs, according to the intermediate key, secure communication processing on the mobile terminal handed over to the target network.

The sending module 152 may include:

a seventh sending unit 1527, configured to send the random value $NONCE_{MSC}$ to the target access network node eNB16, so that the eNB16 generates a transparent container in which the random value $NONCE_{MSC}$ is encapsulated; and an eighth sending unit 1528, configured to, when the receiving module 151 receives the transparent container, in which the $NONCE_{MSC}$ is encapsulated, sent by the eNB16, include the transparent container in a handover response message, and send the handover response message to the network switching node 12;

or includes:

a sixth generating module 158, configured to generate a random value $NONCE_{MME}$, and generate an intermediate key according to the random value $NONCE_{MME}$ and the local key, so that the MME subsequently performs, according to the intermediate key, secure communication processing on the mobile terminal handed over to the target network.

The sending module 152 may include:

a ninth sending unit 1529, configured to send the random value $NONCE_{MME}$ to the target access network node eNB16, so that the eNB16 generates a transparent container in which the random value $NONCE_{MME}$ is encapsulated; and a tenth sending unit 1520, configured to, when the receiving module 151 receives the transparent container, in which the $NONCE_{MSC}$ is encapsulated, sent by the eNB16, include the transparent container in a handover response message, and send the handover response message to the network switching node 12.

Figure 10:
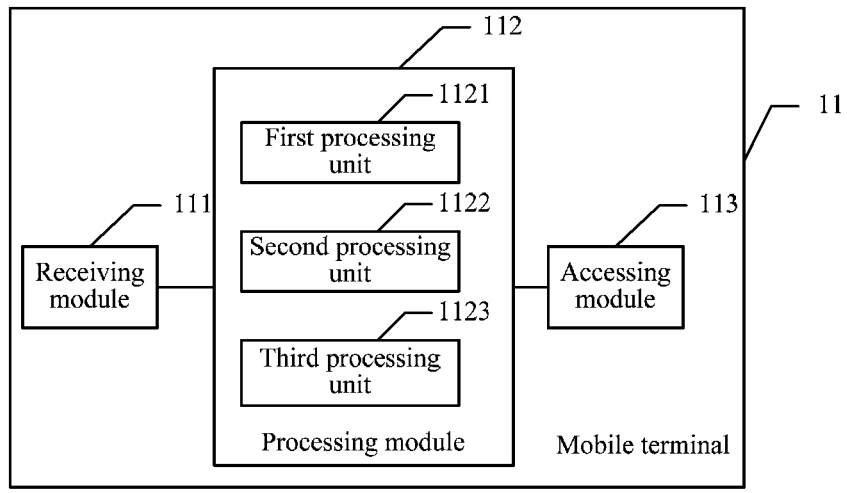
FIG. 10 is a schematic structural composition diagram of a mobile terminal in FIG. 6.

Referring to FIG. 10, the mobile terminal 11 may specifically include:

a receiving module 111, configured to receive a handover command sent by the network switching node 12, where the handover command is generated by the network switching node 12 according to a handover response message sent by a target network node;

a processing module 112, configured to generate a security key according to a random value carried in the handover command and a local key of the mobile terminal 11; where similarly, in order to distinguish the receiving module 111 and the processing module 112 from the foregoing receiving module and processing module, the receiving module 111 may be named as a terminal receiving module, and the processing module 112 may be named as a terminal processing module; and an accessing module 113, configured to access the target network according to the handover command and the security key.

Specifically, the local key of the mobile terminal 11 includes a local cipher key and/or a local integrity protection key.

The processing module 112 may specifically include:

a first processing unit 1121, configured to generate a target key according to the random value carried in the handover command and the local cipher key and/or the local integrity protection key, where the target key is used as a security key for accessing the HSPA network, and the target key includes a target cipher key and/or a target integrity protection key;

a second processing unit 1122, configured to generate an intermediate key according to the random value carried in the handover command, the local cipher key and/or the local integrity protection key, and a preset derivation algorithm, where the intermediate key is used as a security key for accessing the LTE network; and a third processing unit 1123, configured to generate a target key according to the random value carried in the handover command, the local cipher key and/or the local integrity protection key, and a preset derivation algorithm, and generate an intermediate key according to the target key and the random value that is carried in the handover command, where the intermediate key is used as a security key for accessing the LTE network.

Figure 11:
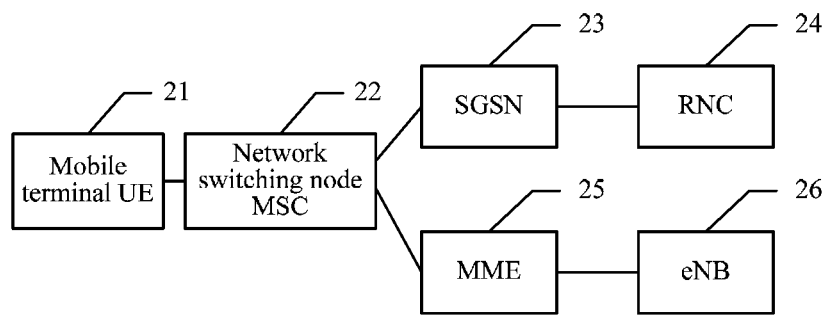
FIG. 11 is a schematic structural composition diagram of an embodiment of another security processing system in a network handover process according to the present invention.
Figure 12:
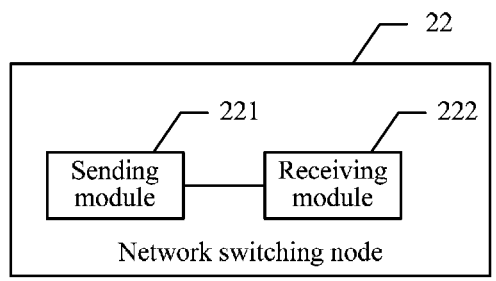
FIG. 12 is a schematic structural composition diagram of a network switching node in FIG. 11.

Referring to FIG. 11, FIG. 11 is a schematic structural composition diagram of an embodiment of another security processing system in a network handover process according to the present invention. The system includes: a mobile terminal 21, a network switching node 22, a serving general packet radio service support node SGSN23, a target access network node RNC24, a mobility management entity MME25, and a target access network node eNB26. In this embodiment, the network switching node 22 does not obtain a random value $NONCE_{MSC}$ or calculate a target key, and directly sends a local key stored by the network switching node 22 to the target network node SGSN23 or MME25, and in this case, referring to FIG. 12, the network switching node 22 may specifically include:

a sending module 221, configured to send security information including a local key of the network switching node to a target network node after a handover request is received, where the local key includes a local cipher key and/or a local integrity protection key; and a receiving module 222, configured to receive a handover response message sent by the target network node, that is, the SGSN23 or the MME25.

The sending module 221 is further configured to send a handover command to the mobile terminal 21, so that the mobile terminal 21 accesses a target network, that is, accesses an HSPA network where the SGSN23 is or an LTE network where the MME25 is.

Target network nodes in different target networks may execute different operations, handover response messages specifically received by the receiving module may be different, and specifically:

when the target network node is the SGSN23, the receiving module 222 is specifically configured to receive a handover response message which is sent by the SGSN23 and carries a transparent container, where the transparent container is generated by the target access network node RNC24 after the target key sent by the SGSN23 is received and the transparent container is sent to the SGSN23 by the target access network node RNC24, the transparent container includes a random value $NONCE_{SGSN}$ encapsulated by the RNC24, the random value $NONCE_{SGSN}$ is generated by the SGSN23, and the target key is generated by the SGSN23 according to the random value $NONCE_{SGSN}$ and the local key that is in the security information for the target access network node RNC24 to subsequently perform, according to the target key, secure communication processing on the mobile terminal 21 handed over to the target network; and when the target network node is the MME25, the receiving module 222 is specifically configured to receive a handover response message which is sent by the MME25 and carries a transparent container, where the transparent container is generated by the target access network node eNB26 and is sent to the MME25 by the target access network node eNB26, the transparent container includes a random value $NONCE_{MME}$ encapsulated by the eNB26, the random value $NONCE_{MME}$ is generated by the MME, and the MME23 further generates an intermediate key according to the random value $NONCE_{MME}$ and a local key that is in the security information, so that the MME23 subsequently performs, according to the intermediate key, secure communication processing on the mobile terminal 21 handed over to the target network.

The sending module 221 is specifically configured to carry the transparent container in a handover command, and send the handover command to the mobile terminal 21; or send the transparent container to the mobile terminal 21 through a source access network node.

Figure 13:
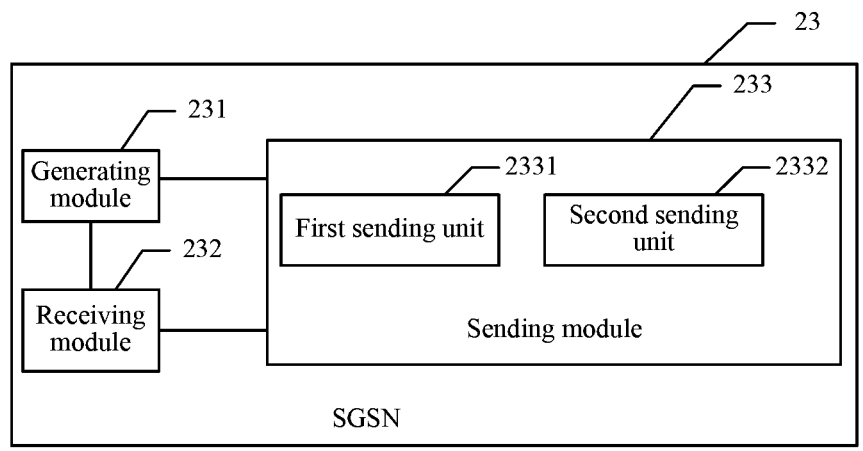
FIG. 13 is a schematic structural composition diagram of a target network node SGSN in FIG. 11.

The foregoing SGSN23 may specifically include modules and units shown in FIG. 13:

a generating module 231, configured to generate a random value $NONCE_{SGSN}$, and generate a target key according to the random value $NONCE_{SGSN}$ and a local key that is in security information;

a receiving module 232, configured to receive security information which is sent by the network switching node 22 and includes a local key of the network switching node 22, where the local key includes a local cipher key and/or a local integrity protection key; and a sending module 233, configured to send a handover response message to the network switching node 22, so that the network switching node 22 sends a handover command to the mobile terminal 21 for the mobile terminal 21 to access the target network.

The sending module 233 may specifically include:

a first sending unit 2331, configured to send the target key to the target access network node RNC24, so that the target access network node RNC24 subsequently performs, according to the target key, secure communication processing on the mobile terminal 21 handed over to the target network; and a second sending unit 2332, configured to, when the receiving module 232 receives a transparent container, in which the random value $NONCE_{SGSN}$ is encapsulated, generated by the target access network node RNC24, carry the transparent container, in which the random value $NONCE_{SGSN}$ is encapsulated, in a handover response message, and send the handover response message to the network switching node 22.

Figure 14:
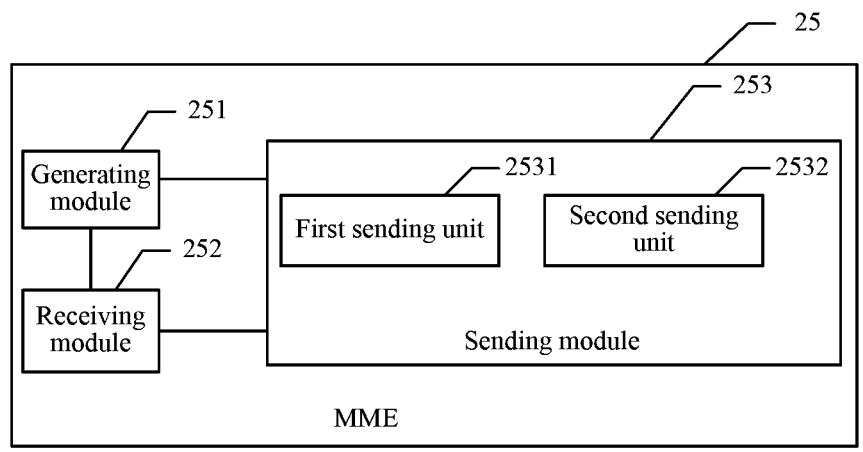
FIG. 14 is a schematic structural composition diagram of a target network node MME in FIG. 11.

The MME25 may specifically include modules and units shown in FIG. 14:

a generating module 251, configured to generate a random value $NONCE_{MME}$, and generate an intermediate key according to the random value $NONCE_{MME}$ and the local key that is in the security information;

a receiving module 252, configured to receive security information which is sent by the network switching node 22 and includes the local key of the network switching node 22, where the local key includes the local cipher key and/or the local integrity protection key; and a sending module 253, configured to send a handover response message to the network switching node 22, so that the network switching node 22 sends a handover command to the mobile terminal 21 for the mobile terminal 21 to access the target network.

The sending module 253 includes:

a first sending unit 2531, configured to send the random value $NONCE_{MME}$ to the target access network node eNB26; and a second sending unit 2532, configured to, when the receiving module 252 receives a transparent container, in which the random value $NONCE_{MME}$ is encapsulated, generated by the target access network node eNB26, carry the transparent container, in which the random value $NONCE_{MME}$ is encapsulated, in a handover response command, and send the handover response command to the network switching node 22.

Figure 15:
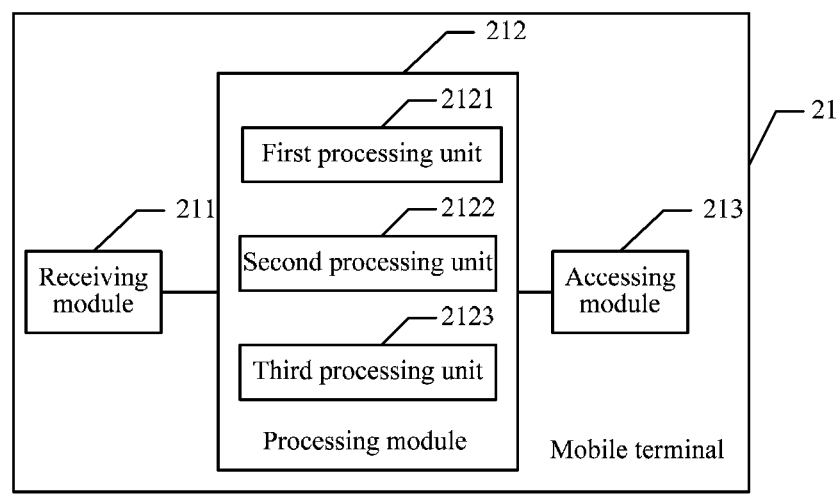
FIG. 15 is a schematic structural composition diagram of a mobile terminal in FIG. 11.

The mobile terminal 21 may also include modules and units shown in FIG. 15:

a receiving module 211, configured to receive a handover command sent by the network switching node, where the handover command is generated by the network switching node according to a handover response message sent by a target network node;

a processing module 212, configured to generate a security key according to a random value carried in the handover command and a local key of the mobile terminal; and an accessing module 213, configured to access the target network according to the handover command and the security key.

Specifically, the local key of the mobile terminal 21 includes a local cipher key and/or a local integrity protection key. The processing module 212 includes:

a first processing unit 2121, configured to generate a target key according to the random value carried in the handover command and the local cipher key and/or the local integrity protection key, where the target key is used as a security key for accessing the HSPA network, and the target key includes a target cipher key and/or a target integrity protection key;

a second processing unit 2122, configured to generate an intermediate key according to the random value carried in the handover command, the local cipher key and/or the local integrity protection key, and a preset derivation algorithm, where the intermediate key is used as a security key for accessing the LTE network; and a third processing unit 2123, configured to generate a target key according to the random value carried in the handover command, the local cipher key and/or the local integrity protection key, and a preset derivation algorithm, and generate an intermediate key according to the target key and the random value that is carried in the handover command, where the intermediate key is used as a security key for accessing the LTE network.

According to the embodiment of the present invention, security processing may be better completed in handover of the mobile terminal from the 3G network to the HSPA network or the LTE network in a case that the network switching node currently used in the network is not changed, thereby saving costs.

Person of ordinary skill in the art may understand that all or part of the processes of the methods in the foregoing embodiments may be implemented by a computer program instructing relevant hardware. The program may be stored in a computer readable storage medium. When the program is run, the processes of the methods in the foregoing embodiments are performed. The storage medium may be a magnetic disk, an optical disk, a read-only memory (ROM), or a random access memory (RAM), or the like.

The foregoing disclosure is merely exemplary embodiments of the present invention, and definitely is not intended to limit the scope of the claims of the present invention.

Therefore, equivalent variations made according to the claims of the present invention shall fall within the scope of the present invention.

What is claimed is:

1. A security processing method in a network handover process of a mobile terminal from a source network to a target network, the method comprising:
   receiving, by a mobile switching center (MSC) server in the source network, a handover request message;
   generating, by the MSC server, a random value;
   generating, by the MSC server based on the random value, a target key in the target network, wherein the target network is any one of a high speed packet access (HSPA) network or a long term evolution (LTE) network;
   sending, by the MSC server, security information comprising the target key to a target network node regardless of whether the target network is the HSPA network or the LTE network, wherein the target key is used for a target access network node to perform, according to the target key, secure communication processing on a mobile terminal handed over to the target network;
   receiving, by the MSC server, a handover response message sent by the target network node, wherein the handover response message carries a transparent container which is generated by the target access network node; and
   sending, by the MSC server, a handover command to the mobile terminal for the mobile terminal to access the target network, wherein the handover command carriers the random value and the transparent container.

2. The method according to claim 1, wherein the generating the target key comprises:
   generating, by MSC server, the target key according to the random value and a local key of the MSC server, wherein the local key comprises a local cipher key and a local integrity protection key, and the target key comprises a target cipher key and a target integrity protection key.

3. The method according to claim 1, wherein,
   the target network node is a serving general packet radio service (GPRS) support node (SGSN) and the target network is the HSPA network, wherein before the receiving the handover response message, the method further comprises:
   sending, by the SGSN, the target key to the target access network node;
   receiving, by the SGSN, the transparent container from the target access network node.

4. The method according to claim 1, wherein the sending, by the MSC server, the handover command to the mobile terminal comprises:
   sending, by the MSC server, the random value and the transparent container to a source access network node, wherein the random value and the transparent container are sent to the mobile terminal by the source access network node through the handover command.

5. A security processing method in a network handover process of a mobile terminal from a source network to a target network, comprising:
   receiving, by a mobile switching center (MSC) server in the source network, a handover request message;
   generating, by the MSC server, a random value;
   generating, by the MSC server based on the random value, a target key in the target network, wherein the target network is a high speed packet access (HSPA) network or a long term evolution (LTE) network;
   sending, by the MSC server, security information comprising the target key to a target network node regardless of whether the target network is the HSPA network or the LTE network, wherein the target key is used for a target access network node to perform, according to the target key, secure communication processing on the mobile terminal handed over to the target network;
   receiving, by a mobility management entity (MME), the security information which is sent by the MSC server;
   sending, by the MME, the target access network node;
   receiving, by the MME, a transparent container from the target access network node; and
   sending, by the MME, a handover response message to the MSC server;
   sending, by the MSC server, a handover command to the mobile terminal for accessing the target network, wherein the handover command carriers the transparent container and the random value.

6. The method according to claim 5, wherein the target key is generated by the MSC server according to the random value, and a local key of the MSC server, wherein the local key comprises a local cipher key and a local integrity protection key, and the target key comprises a target cipher key and a target integrity protection key.

7. A mobile switching center (MSC) server comprising:
   a receiver configured to receive a handover request message generated by a target access network node and also configured to receive a handover response message carrying a transparent container sent by a target network node;
   a processor configured to generate a target key in a target network based on a random value, wherein the target network is a high speed packet access (HSPA) network or a long term evolution (LTE) network;
   a transmitter configured to send security information comprising the target key to the target network node regardless of whether the target network is the HSPA network or the LTE network, wherein the target key is used for the target access network node to perform, according to the target key, secure communication processing on a mobile terminal handed over to the target network; and
   the transmitter is further configured to send a handover command to the mobile terminal for the mobile terminal to access the target network, wherein the handover command carriers the random value and the transparent container.

8. The MSC server according to claim 7, wherein the processor in generating the target key is configured to:
   generate the target key according to the random value and a local key of the MSC server, wherein the local key comprises a local cipher key and a local integrity protection key, and the target key comprises a target cipher key and a target integrity protection key.

9. The MSC server according to claim 8, wherein,
   the target network node is a serving general packet radio service (GPRS) support node (SGSN), and when receiving the handover response message sent by the target network node, the transmitter is configured to:
   receive the handover response message which is sent by the SGSN.

10. The MSC server according to claim 8, wherein,
    the target network node is a mobility management entity (MME), the receiver in receiving the handover response message is configured to: receive the handover response message which is sent by the MME.

11. The MSC server according to claim 7, wherein,
the target network node is a serving general packet radio service (GPRS) support node (SGSN) and the target network is the HSPA network, the receiver in receiving the handover response message is configured to:
receive the handover response message which is sent by the SGSN and carries a transparent container, wherein the transparent container is generated by the target access network node after the SGSN sends the target key to the target access network node.

12. The MSC server according to claim 7, wherein,
when sending the handover command to the mobile terminal, the transmitter is configured to: send the random value and the transparent container to a source access network node, wherein the random value and the transparent container are sent to the mobile terminal by the source access network node through the handover command.

13. A communication system comprising a mobile switching center (MSC) server and a mobility management entity (MME), wherein in a network handover process of a mobile terminal from a source network to a target network,
the MSC server is configured to:
receive a handover request message;
generate a random value;
generate, based on the random value, a target key in the target network, wherein the target network is any one of a high speed packet access (HSPA) network or a long term evolution (LTE) network; and
send security information comprising the target key to a target network node regardless of whether the target network is the HSPA network or the LTE network, wherein the target key is used for a target access network node to perform, according to the target key, secure communication processing on the mobile terminal handed over to the target network;
the MME is configured to:
receive the security information;
send the target key to the target access network node;
receive a transparent container from the target access network node; and
send a handover response message to the MSC server; and
the MSC server is further configured to:
send a handover command to the mobile terminal for accessing the target network, wherein the handover command carriers the transparent container and the random value.

14. The communication system according to claim 13, wherein
the target key is generated by the MSC server according to the random value and a local key of the MSC server, wherein the local key comprises a local cipher key and a local integrity protection key, and the target key comprises a target cipher key and a target integrity protection key.

* * * * *

UNITED STATES PATENT AND TRADEMARK OFFICE
CERTIFICATE OF CORRECTION

PATENT NO. : 9,681,339 B2
APPLICATION NO. : 14/526205
DATED : June 13, 2017
INVENTOR(S) : Chen et al.

Page 1 of 1

It is certified that error appears in the above-identified patent and that said Letters Patent is hereby corrected as shown below:

In the Claims

Column 38, Line 11: "the target access network node;"
Should read:
-- the target key to the target access network node; --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*